May 19, 1970 N. KITZ ET AL 3,513,303
DESK CALCULATOR FOR PERFORMING ADDITION, SUBTRACTION, MULTIPLICATION AND DIVISION
Filed March 22, 1965 4 Sheets-Sheet 1

NORBERT KITZ
JOHN G. LLOYD
JAMES J. DRAGE
INVENTORS

BY
Pennie Edmonds Morton Taylor Adams

ATTORNEY

May 19, 1970 N. KITZ ET AL 3,513,303

DESK CALCULATOR FOR PERFORMING ADDITION, SUBTRACTION, MULTIPLICATION AND DIVISION

Filed March 22, 1965 4 Sheets-Sheet 2

NORBERT KITZ
JOHN G. LLOYD
JAMES G. DRAGE
INVENTORS

BY

Perni Edmonds, Morton, Taylor & Adams

ATTORNEY

NORBERT KITZ
JOHN G. LLOYD
JAMES G. DRAGE
INVENTORS
BY
Penn Edmonds Nolan Taylor & Adams
ATTORNEY May 19, 1970 N. KITZ ET AL 3,513,303

DESK CALCULATOR FOR PERFORMING ADDITION, SUBTRACTION, MULTIPLICATION AND DIVISION

Filed March 22, 1965 4 Sheets-Sheet 4

INVENTORS
NORBERT KITZ
JOHN G. LLOYD
BY
ATTORNEY

United States Patent Office 3,513,303

Patented May 19, 1970

3,513,303
DESK CALCULATOR FOR PERFORMING ADDITION, SUBTRACTION, MULTIPLICATION AND DIVISION

Norbert Kitz, John G. Lloyd, and James J. Drage, London, England, assignors to Bell Punch Company Limited, London, England, a British company Filed Mar. 22, 1965, Ser. No. 441,736
Claims priority, application Great Britain, Mar. 21, 1964, 12,036/64
Int. Cl. G06f *15/02*
U.S. Cl. 235—160 25 Claims

ABSTRACT OF THE DISCLOSURE

A calculating machine having a plurality of pulse-operated counting devices forming a register includes a cyclically operable pulse generator, a common pulse entry line, a plurality of orders of keys, a cyclically operable register timing device having plural outputs for coupling the common pulse entry line to the register counting devices successively, a cyclically operable keyboard timing device having plural outputs for actuating the orders of keys successively in controlling the application of pulses from the pulse generator to the pulse entry line, means to select a timing device stepping the pulse from each cycle of the pulse generator, and at least two timing gates controlling access of the stepping pulse to at least one of the timing devices whereby the relative timing of the outputs from the timing device may be changed to advance the outputs of either timing device with respect to the outputs from the other and thereby to alter toward either higher or lower orders in the register the destination of pulses appearing on the common entry line under control of the various orders of keys. The machine is capable of multiplying a multiplicand entered on the keys by a multi-digit multiplier entered in the upper end of the register with the aid of a buffer counter into which multiplier digits of successively higher order are transferred for control of iterated addition into the lower end of the register of at least the most significant digits of the multiplicand. The machine performs division by causing the timing devices to slip with respect to each other in the opposite direction so as to perform iterated addition of a divisor, set on the keyboard, into successively lower orders of the register as successive quotient digits are extracted. Apparatus for correct positioning of the decimal point and for left and right shift in the register of numbers already set therein is also disclosed.

Figure 1:
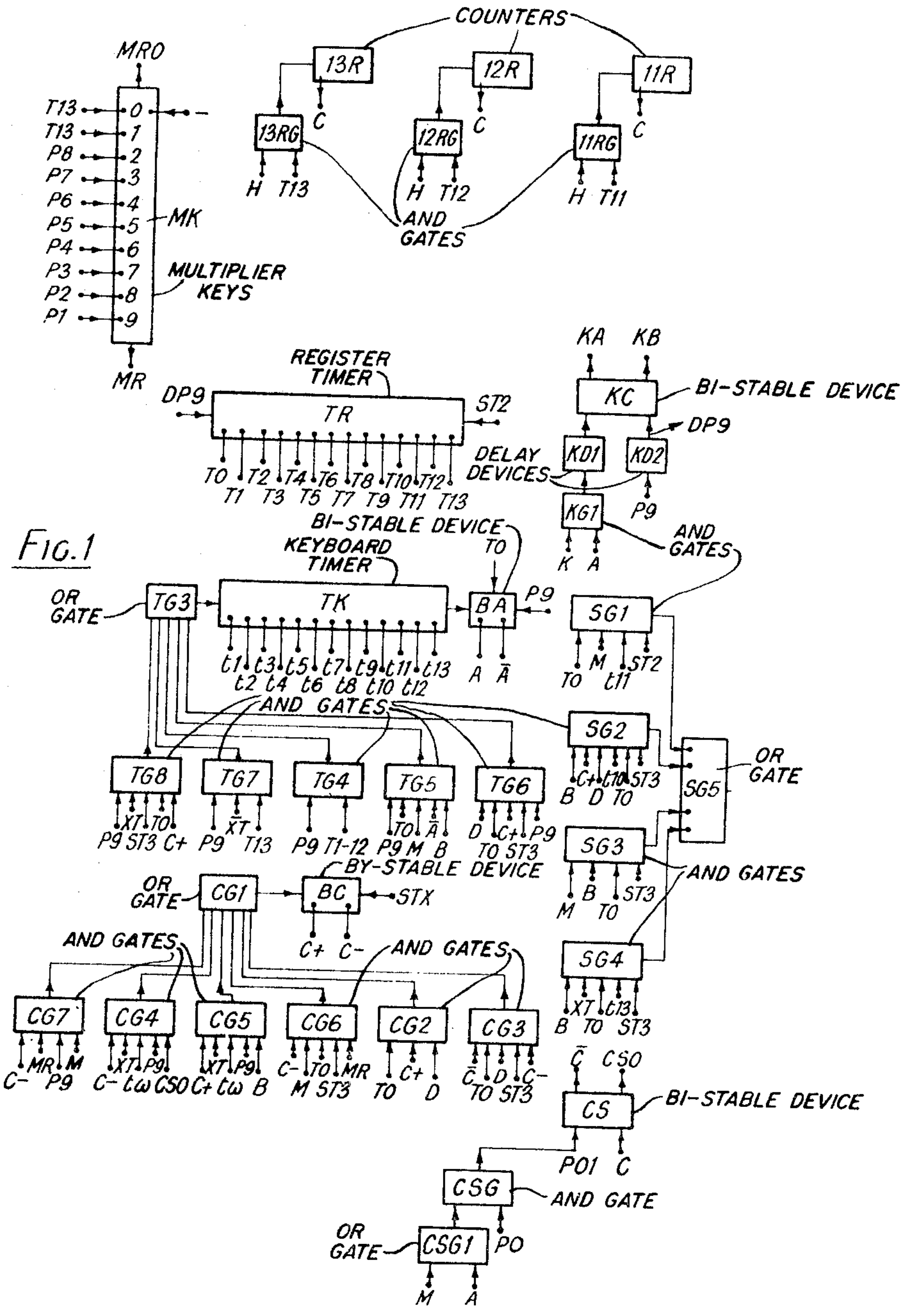

This invention relates to calculating machines of the general type described and claimed in our copending application Ser. No. 226,064, filed Sept. 25, 1962, now United States Pat. No. 3,296,425.

It is an object of the invention to provide an improved machine of the said type. It is a further object of the invention to enable a machine of the said type to perform a number of additional arithmetical operations. The provision of the new facilities necessitates alterations in the manner in which certain arithmetical operations are performed, and accordingly it is a further object of the invention to provide a calculating machine of the said type which performs arithmetical operations in a novel manner.

One of the additional facilities provided by the new machine comprises the multiplication of a number of factors greater than two. Thus, for example, it may be necessary to multiply a multiplicand by a first multiplier and then to multiply the resulting product by a second multiplier. A machine in accordance with the present invention enables such a calculation to be performed without the necessity for clearing the first product from the register and inserting it in the keys before the second multiplication is performed.

Accordingly, from this aspect, the invention comprises a calculating machine including a register and a plurality of keys, wherein the machine is operative to multiply a multiplicand entered on said keys by a multiplier stored in said register by replacing the digits of said multiplier successively by zeros in successive stages of the calculation and by adding the multiplicand into the register during each stage of the calculation a number of times equal to the numerical value of the digit of the multiplier that is replaced by zero in that stage.

From this aspect, the invention also comprises a calculating machine including a plurality of groups of keys each group representing a denominational order and each key in a group having a numerical value, a register comprising a plurality of electric-pulse-operated counting devices each representing a denominational order, wherein the machine is operative to multiply a multiplicand entered on said groups of keys by a multiplier stored in the said register, and wherein during each successive stage of said multiplication a digit of said multiplier is reduced to zero and the multiplicand is added into the register a number of times equal to the value of that digit.

More specifically, from this aspect, the invention comprises a calculating machine including a plurality of groups of keys each group representing a denominational order and each key having a numerical value, a register comprising a plurality of electric-pulse-operated counting devices each representing a denominational order, and means for associating said groups of keys with counting devices representing progressively higher orders of said register during successive stages of the calculation, wherein the machine is operative to multiply a multiplicand entered on said groups of keys by a multiplier stored in said register, the counting device containing the least significant digit of the multiplier being caused to register zero and at least the most significant digits of the multiplicand being added into counting devices of the register representing lower orders than the order of said least significant digit of the multiplier a number of times equal to the numerical value of said least significant digit during the first stage of the calculation, and the counting devices containing the higher digits of the multiplier being successively caused to register zero during successive stages of the calculation and the multiplicand being introduced into the register during each successive stage of the calculation a number of times equal to the numerical value of the digit of the multiplier that has been reduced to zero in that stage.

To enable multiplication to be performed in the manner described above, it is preferable that during each stage of the multiplication a digit of the multiplier is transferred from the register to a store and the multiplicand is then added into the register a number of times equal to the transferred digit. Said storage may be effected by entering in a buffer counter the complement of the digit transferred from the register. In this case one pulse is added into the buffer counter for each addition of the multiplicand into the register and the series of additions is stopped when the buffer counter registers zero.

Thus, the invention also comprises a calculating machine including a plurality of groups of keys each group representing a denominational order and each key having a numerical value, a register comprising a plurality of electric-pulse-operated counting devices each representing a denominational order, and means for associating said groups of keys with counting devices representing progressively higher orders of said register during successive stages of the calculation, wherein the machine is operative to multiply a multiplicand entered on said groups of keys by a multiplier stored in said register, and wherein during each of said successive stages the complement of the number registered by one of the counting devices in the register is entered in a buffer counter and the machine is caused to perform a number of cycles of operation during each of which one pulse is added into the buffer counter and numbers of pulses corresponding to the numerical values of any actuated keys are entered into the counting devices associated with those keys during that stage of the calculation until the buffer counter registers zero.

Pulses may be applied to the counting devices over a common line and a carry store may be used for controlling the transfer of numbers to and from the buffer counter. Thus, the invention also comprises a calculating machine including a pluarality of groups of keys each group representing a denominational order and each key having a numerical value, a register comprising a plurality of electric-pulse-operated counting devices each representing a denominational order, a pulse generator, a buffer counter, a carry store set when any of said counting devices is stepped to zero, a plurality of first gating means for coupling respective ones of the counting devices to a common line, a plurality of second gating devices each operative when closed to enable the number of pulses supplied to said common line by said pulse generator to be controlled by a respective one of said groups of keys, a first timing device controlling said first gating means, a second timing device controlling said second gating means, means for stepping said timing devices so that the gating means are rendered operative in succession, pulsing means controlled by said second timing device for enabling pulses to be applied by said pulse generator to the buffer counter and to the common line at a time when one of said first gating means is operative but none of the second gating means are operative, means for disabling said pulsing means when said carry store is set, and means operative after said pulsing means has been disabled for causing the machine to perform a number of addition cycles during each of which one pulse is added to the buffer counter and numbers of pulses are applied to the common line under the control of said groups of keys as the second gating means are opened by said second timing device.

The method of performing multiplication described above is in principle the reverse of the method used in a machine of the type described for performing division. To enable the division process to be reversed, it is convenient for a novel means of controlling the calculation to be used and, accordingly, from this aspect the invention comprises a calculating machine including a plurality of first counting devices each representing a denominational order, a second counting device representing the next order above the highest order represented by the first counting devices, carry means operative between adjacent ones of said first counting devices and between the highest of said first counting devices and the second counting device, means for entering a dividend into the first counting devices, means for performing repeated subtraction of a divisor from the dividend, means for ascertaining when there is no carry from the highest of said first counting devices to the second counting device and for thereafter adding the divisor back once to the dividend remainder, means for subtracting unity from the number registered by a third counting device during each of said repeated subtractions, and means for adding into said second counting device the complement of the number registered by the third counting device after the completion of said repeated subtractions.

From this aspect the invention also comprises a calculating machine including a plurality of first counting devices each representing a denominational order, a second counting device representing the order above the highest order represented by the first counting devices a third counting device, means for entering a dividend in the first counting devices, means for performing repeated subtraction of a divisor from the dividend, each subtraction being performed by the addition of the complements of the individual digits of the devisor to the individual digits of the dividend during successive cycles of operation, a carry store set when any of said first counting devices register zero and unset at the beginning of each of said cycles of operation, means for ascertaining when the carry store is unset after the addition of the complement of the highest digit of the divisor to the highest digit of the dividend or dividend remainder, means controlled by said ascertaining means for adding the divisor back once to the dividend remainder, means for subtracting unity from the number registered by the third counting device once during each of said repeated subtractions, and means for adding into the second counting device the complement of the number registered by said third counting device.

It wil be understood that in the case of a machine having decade counting devices, the second counting device will register 9 after there has been no carry from the highest first counting device and therefore the addition of the tens complement of the number registered by the third counting device will give the quotient digit correctly as one less than the number of subtraction performed. Thus, if the number of subtractions performed is, for example, four, the third counting device will register 6 (10—4) and the addition of 4 to 9 will leave the second counting device registering 3.

As has already been stated, a machine in accordance with the invention may be arranged to perform division and also a multiplication process which is the reverse of the division process. Accordingly, from this aspect the invention consists in a calculating machine including a plurality of counting devices forming a register and a plurality of groups of keys each group representing a denominational order and each key in a group having a numerical value, wherein the machine can be set to divide a dividend stored in said register by a divisor set on said keys and to enter each successive digit of the quotient into the counting device to the left of the counting device containing the highest order digit of the dividend remainder, and wherein the machine can also be set to multiply a multiplicand set on said keys by a multiplier stored in said register and to enter each partial product of said multiplicand and a respective digit of said multiplier into counting devices of said register to the right of the counting device containing said multiplier digit.

Figure 1A:
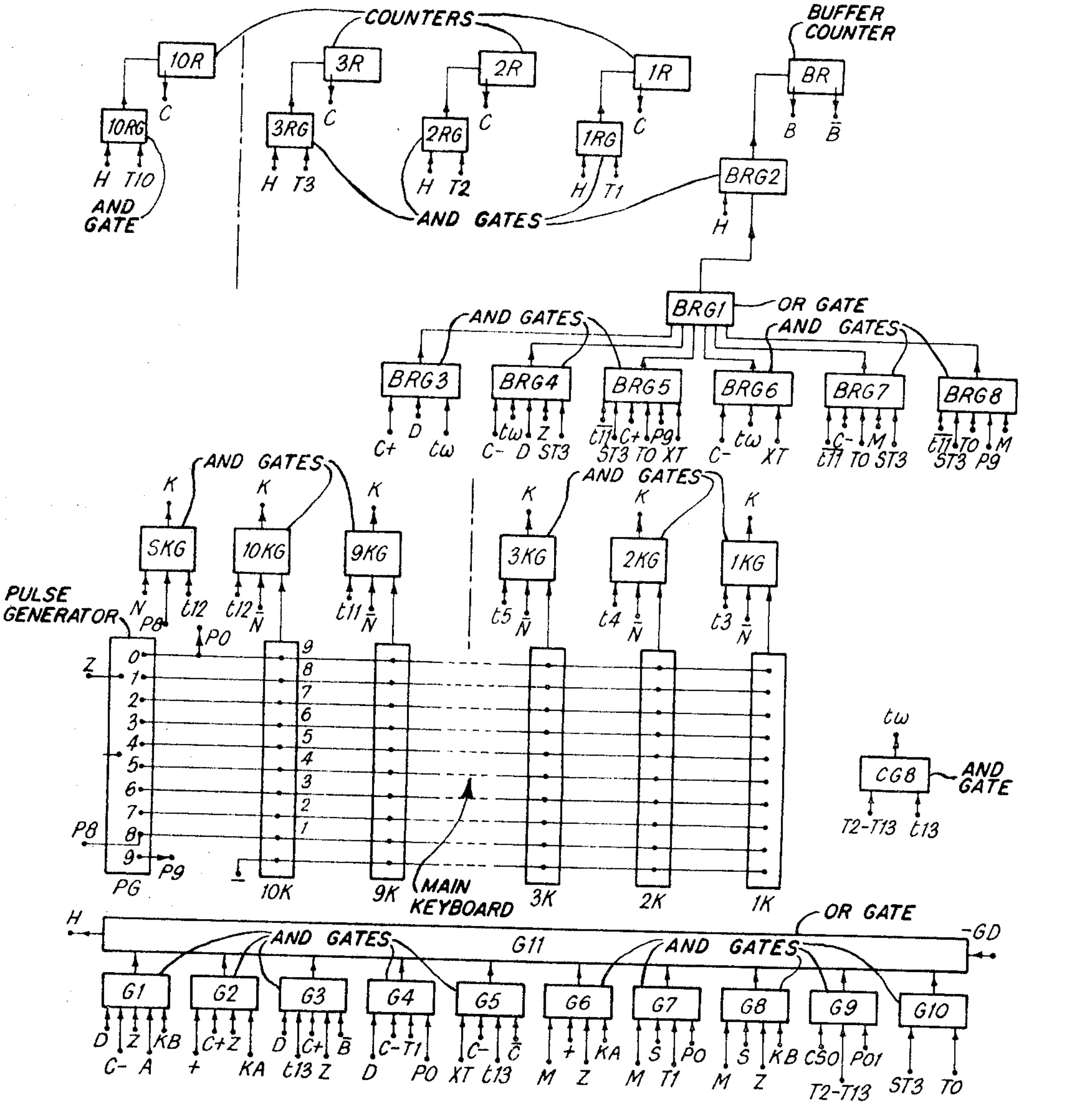

The invention will now be further described with reference to the accompanying drawings in which:

FIGS. 1 and 1a constitute a block diagram of a calculating machine in accordance with the invention, FIG. *1a* fitting to the right of FIG. 1 with the output at the right of the block SG5 in FIG. 1 connecting to the middle input on the left of the block PG in FIG. *1a*.

Figure 2:
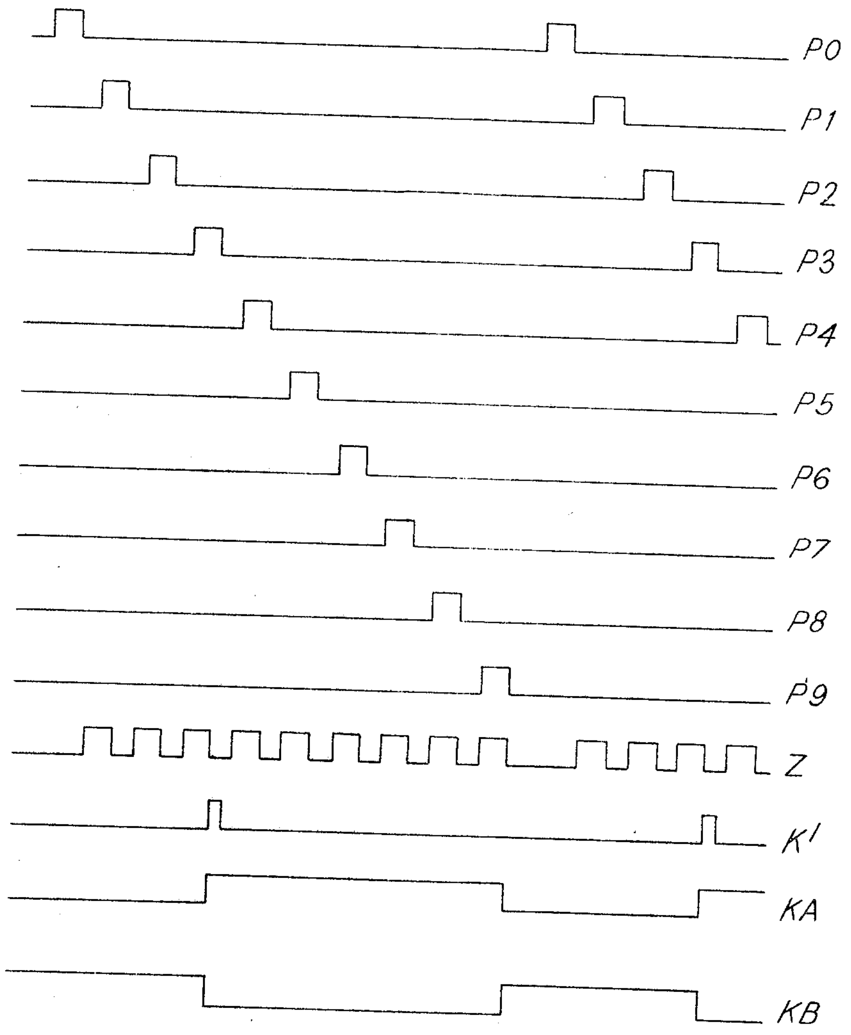
Figure 3:
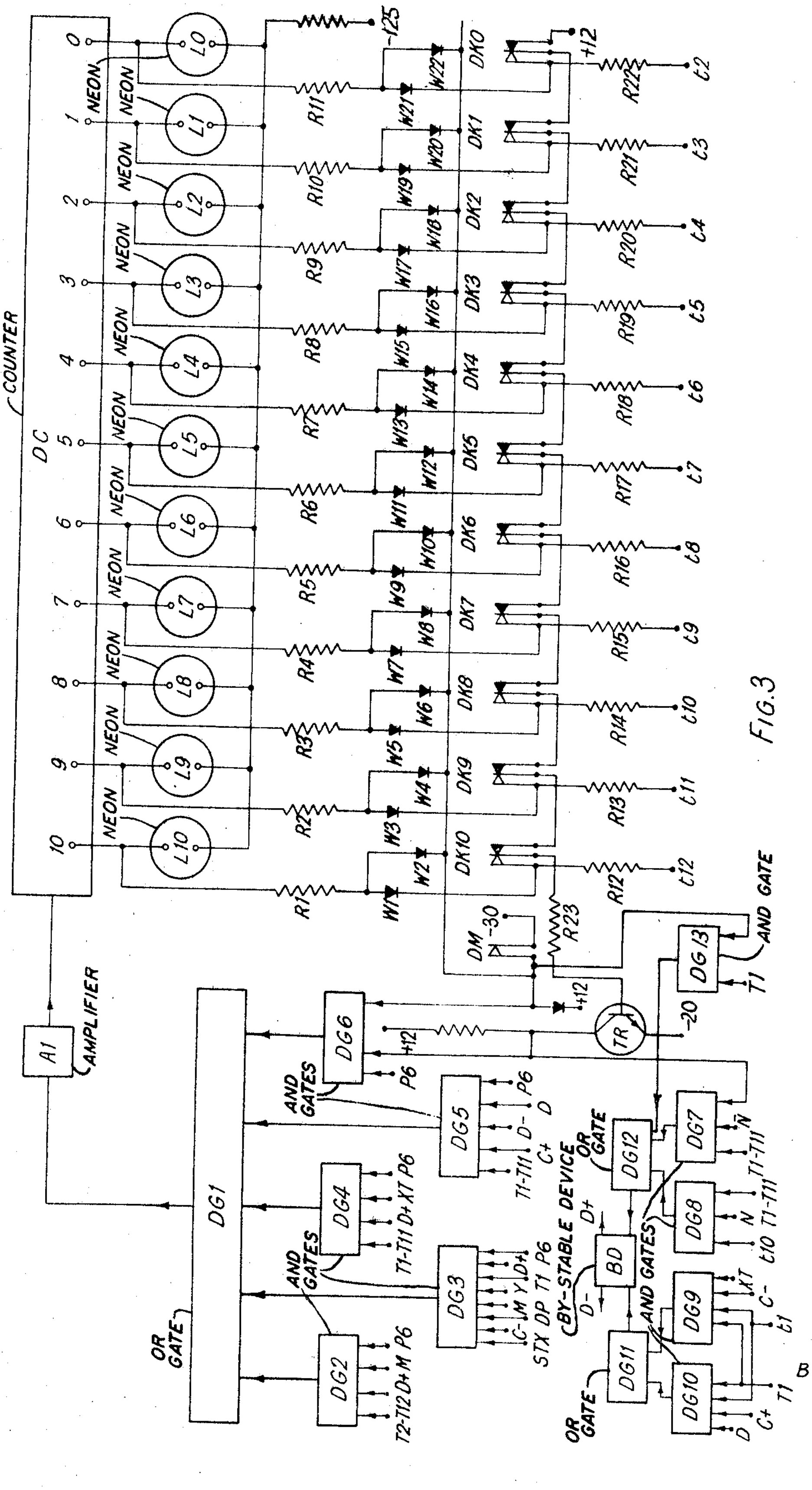

FIG. 2 is a pulse diagram illustrating waveforms appearing at various points in the machine illustrated in FIG. 1; and FIG. 3 illustrates the decimal point control means in a machine as illustrated in FIG. 1, partly in the form of a block diagram and partly in the form of a circuit diagram.

The calculating machine illustrated in FIG. 1 includes ten groups of keys 1K to 10K, each representing a denominational order and hereinafter referred to as an order of keys, of which only the first three orders (1K, 2K and 3K) and the last two orders (9K and 10K) are shown in the drawing. The register of the machine comprises thirteen counting devices (1R to 13R) of which eleven (3R to 13R) are visible to the operator, so that the counting device 3R represents the unit order of the register. Of these counting devices only the first three (1R, 2R and 3R), the last four (10R, 11R, 12R and 13R) are shown in the drawing. The counting devices 1R to 12R can be associated in various ways with the ten orders of keys in the sense that the number of pulses delivered to any one of the counting devices 1R to 11R can be placed under the control of any one order of keys in a separate plurality of such orders of keys, while the number of pulses delivered to the counting device 12R can be controlled only by the order of keys 10K. Thus, for example, the counting device 3R can be associated with any one of the ten orders of keys 1K to 10K, the counting device 2R can be associated with any of the nine orders of keys 1K to 9K and the counting device 1R can be associated with any of the eight orders of keys 1K to 8K. Similarly the counting device 4R can be associated with any of the nine orders of keys 2K to 10K, the counting device 5R with any of the eight orders of keys 3K to 10K, and so on up to the device 12R which can only be associated with the order of keys 10K. The counting device 13R is provided to receive carry pulses from the counting device 12R and this counting device cannot be associated with any of the orders of keys. It will be appreciated that there is no limit to the number of orders of keys and counting devices which can be employed in order to obtain any desired capacity for the machine, but it will normally be desirable to make the number of counting devices greater than the number of orders of keys in order to accommodate carry-over from the highest order counting device which can be associated with an order of keys.

Each counting device will preferably be in the form of a ring counter of the kind described and claimed in United States Pat. No. 3,398,265.

Each counting device has associated therewith an input gate and in the drawing there are illustrated input gates 1RG, 2RG and 3RG for the first three counting devices 1R, 2R and 3R and input gates 10RG, 11RG, 12RG and 13RG for the tenth, eleventh, twelfth and thirteenth counting devices 10R, 11R, 12R and 13R. The counting devices 4R to 9R (not illustrated) are respectively provided with input gates 4RG to 9RG (also not illustrated).

Each of the input gates 1RG to 13RG is in the form of an "AND" logical element. The input gate 1RG, for example, is shown with one input designated H and the other input designated T1. An output is applied to the counting device 1R when both the line H and the line T1 are energised. As a result, if a pulse is applied on the line H while the input T1 is energised, the counting device 1R will have its content increased by unity. If the gates are diode gates, energisation will be effected by changing the potentials of both inputs in the same direction. If a positive-going output is required from the gates to drive the counting devices, energisation of each input will be effected by making its potential more positive. However, it is preferred that each of the input gates should be of the kind described and claimed in United States application Serial No. 279,409 filed May 10, 1963 and now abandoned, and in this case negative-going pulses are applied to the line H, whereas energisation of the terminals T1 to T13 is effected by making them more positive. The remaining "AND" gates, which will be referred to hereinafter, are normal diode gates producing a positive output when both or all their inputs are made positive.

In addition to the input gates 1RG to 13RG associated with the counting devices 1R to 13R, further gates 1KG to 10KG are associated with the orders of keys. In the drawing, gates 1KG to 3KG are shown for the lowest three orders of keys 1K to 3K and gates 9KG and 10KG are shown associated with the top two orders of keys 9K and 10K. These gates are also in the form of "AND" logical elements and as a result an output is applied to a common line K if both the inputs of any of the gates are energised simultaneously. It will be seen that each gate has one input from the order of keys with which it is associated and also a second input designated in the case of the lowest order of keys *t*3 and in the case of the highest order of keys *t*12. The gates associated with the intermediate orders of keys have inputs designated *t*4 to *t*11 in accordance with the rank of the order. Each of the gates 1KG to 10KG has a third input designated $\overline{N}$. Each order of keys consists of nine keys numbered 1 to 9 and all the number nine keys, for example, are connected to a number nine line, all the number eight keys are connected to a number eight line and so on. The actuation of any key in an order serves to connect the corresponding number line of the output from that order of keys to the associated KG gate. When no key in any order is actuated the output from that order consists of a negative potential. The number lines are connected to a pulse generator PG which includes a master oscillator which determines the pulse repetition frequency and which is illustrated as having ten outputs numbered 0 to 9. Respective pulses from the generator appear on these outputs for respective periods of time during a cycle of operation of the pulse generator and the times at which the various pulses appear are illustrated in FIG. 2 of the drawings. The pulse generator PG also has an output Z on which appear nine pulses during each cycle of operation of the pulse generator. As can be seen from FIG. 2, these nine pulses occur at the time when the outputs P1 to P9 are energised. These times will hereinafter be referred to as P1 to P9 and similarly the time when the terminal PO is energised will be referred to as PO.

It will be seen from FIG. 1 of the drawings that the PO output of the pulse generator is connected to all the number nine keys of the orders of keys 1K to 10K; that the P1 output of the pulse generator is connected to all the number eight keys; and so on up to the P8 output which is connected to the number 1 keys.

A further gate, designated SKG, has its output connected to the common line K. This gate is not associated with any order of keys, but one of its inputs is connected directly to the terminal P8 of the pulse generator PG. Its other inputs are constituted by the terminal *t*12 and a terminal N.

The operation of the machine is primarily controlled by two timing devices TR and TK. Each of the timing devices TR and TK may consist, for example, of a ring counter and each is provided with a number of output terminals, the output terminals of the timing device TR being designated T0 to T13 and the output terminals of the timing device TK being designated *t*1 to *t*13. Each of the timing devices is stepped forward by means of input pulses and thus provides a positive potential on each output terminal in succession. Thus initially, for example, the timing device TR provides a positive output on its output terminal T0 and, when this timing device receives an input pulse, the positive potential is removed from the output terminal T0 and appears instead on the output terminal T1. Input pulses are applied to the timing device TR through a differentiating and inverting device KD2 which converts pulses provided by the P9 output of the pulse generator PG into delayed DP9 pulses. A further input to the timing device TR is constituted by an input terminal ST2 and the timing device is held on T0 until a positive potential is applied to the terminal ST2. So long as the positive potential is present on the terminal ST2, the timing device TR can be stepped from T0 to T13 by successive input pulses and it will be seen that, the timing device TR will be stepped forward once during each cycle of operation of the pulse generator by means of a DP9 pulse. Thus the timing device TR will be moved completely from T0 to T13 during fourteen cycles of operation of the pulse generator PG. The various outputs T0 to T13 of the timing device TR are connected to the inputs of the gates 1RG to 13RG and also to certain other gates as indicated by the references T0 to T13 shown at the input of these gates.

The timing device TK is similar to the timing device TR except that it has only thirteen stages instead of fourteen. The timing device TK is stepped from *t*1 to *t*13 by means of input pulses received through an "OR" gate TG3 which has five inputs constituted respectively by the outputs of the five "AND" gates TG4, TG5, TG6, TG7 and TG8. The "AND" gate TG4 has two inputs, one constituted by the P9 output of the pulse generator PG and the second constitued by the terminals T1 to T12 of the timing device TR. Thus, provided the timing device TR is not on T0 nor T13, the timing device TK will receive one stepping pulse through the gate TG4 during each cycle of operation of the pulse generator PG. Under certain conditions, the timing device TK will also receive a stepping pulse through the gate TG7 during the period T13. If the gate TG7 is operative the timing device TK is prevented from moving only while the timing device TR is on T0, and consequently it will also take fourteen cycles of operation of the pulse generator PG to move the timing device TK up to *t*13. Thus, under these conditions the two timers will remain in step and it is the function of the gates TG5, TG6 and TG8 to provide a further pulse to the timing device TK under certain conditions during the period T0. If the further pulses are applied to the timer TK during both the periods T13 and T0, it will advance one step ahead of the timer TR. If, on the other hand, no pulse is applied through any of the gates TG5 to TG7, the timer TK will fall one step behind the timer TR.

The outputs *t*3 to *t*12 of the timing device TK are connected to the inputs of respective ones of gates 1KG to 10KG. Other connections of the various outputs of the timing device TK are as indicated by the references *t*1 to *t*13 shown at the inputs of various gates.

It will be seen that with the equipments so far described each counting device is connected to the line H to receive pulses therefrom for the period during which the corresponding output of the timing device TR is energised, and each order of keys is connected to the line K to deliver a pulse thereto for the period during which the corresponding output of the timing device TK is energised. Thus, if the timing device TR is on T3 while the timing device TK is on *t*3, the units order of keys 1K will be associated with the units counting device 3R, in that, for example, as will presently be explained, a pulse delivered from the pulse generator PG to the line K as the result of the operation of a key in the units order of keys 1K will in specified circumstances set the bi-stable device KC and thereby permit opening of a gate, such as the gate G6, so that pulses thereafter delivered by the pulse generator PG to its Z line may pass to the H line and thence into the counter 3R. Further, if the two timing devices are stepped together, the tens order of keys 2K will be associated with the tens counting device 4R and so on up to the order of keys 10K which will be associated with the counting device 12R. However, if it is arranged, for example, that the timing device TK is on *t*4 while the timing device TR is on T3, then the tens order of keys 2K will be associated with the units counting device 3R. Under these conditions the hundreds order of keys 3K will be associated with the tens counting device 4R and so on up to the order of keys 10K which will be associated with the counting device 11R.

Pulses are applied to the various counting devices 1R to 13R during the corresponding T periods from a common input line H which is fed from the output of an "OR" gate G11. The "OR" gate G11 has ten inputs which are constituted by the outputs of "AND" gates G1 to G10. It will be seen that each of the gates G1 to G9 has an input marked P0, an input marked P01, an input marked Z, in input marked KA, or an input marked KB. Those gates which have inputs marked P0 or P01 serve to supply one pulse direct to the H line when the other inputs to those gates are energised. Similarly, those gates which have Z inputs serve to supply up to nine pulses to the H line when their other inputs are energised. The gates having KA and KB inputs serve to supply numbers of pulses to the H line which are normally determined by the values of any actuated keys in the orders of keys 1K to 10K. The terminals KA and KB are connected to the outputs of a bi-stable device KC and in the rest (or unset) state the output KB is energised. However, the device KC can be changed over to the set state by means of an input through a differentiating and inverting device KD1, the input to which is constituted by the output of an "AND" gate KG1. One of the inputs to this "AND" gate is constituted by the K line and the other input is constituted by a terminal A the function of which will be described hereinafter. The device KC is returned to the rest state by means of a second input which extends from the P9 output of the pulse generator PG through the differentiating and inverting device KD2. The effect of the device KD2 is that the trailing edge of a P9 pulse is operative to return the device KC to its rest state. Similarly the effect of the differentiating and inverting device KD1 is that it is the trailing edge of any pulse applied to the K input of the "AND" gate KG1 that changes the device KC over from its rest state to the state in which the output KA is energised.

The only inputs of the "AND" gate G10 are marked ST3 and T0 and therefore the output of this gate will be energised (made positive) during operation of the machine throughout the whole of each T0 period apart from the T0 period which is in existence at the beginning of a cycle of operation of the machine. However, it will be noted that the gate G11 also has an input marked —GD. This input is a negative-going waveform which is provided primarily for pulse-shaping and to assist in the "closing of the gates G1 to G9 at the end of each pulse as explained in United States application Ser. No. 819,068 filed June 9, 1959, now abandoned. However, the negative excursions of this waveform are sufficient to prevent the positive output from the gate G10 from reaching the H line and accordingly serve to break up the output from the gate G10 into ten pulses which appear on the H line.

In order to explain the manner in which pulses are applied to the counting devices under the control of the keys in the various orders of keys 1K to 10K, it will be assumed that the number six key in the order 1K is depressed, that the timing device TR is on T3 and that the timing device TK is on *t*3. The depression of the number six key in the order of keys 1K connects the output from this order to the P3 output of the pulse generator PG. Since the terminal *t*3 is energised the P3 pulse from the pulse generator will appear on the line K. It will also be assumed that the terminal A is energised so that the P3 pulse will pass through the gate KGI and accordingly its trailing edge will cause the bi-stable device KC to change over to the state in which its output KA is energised. Further, it will be assumed that the terminals M and + of the gate G6 are energised and accordingly, when the terminal KA is energised, this gate will open to allow the remaining pulses appearing on the Z output of the pulse generator PG to be applied through the "OR" gate G11 to the H line. The terminals M and + are energised under control of two of a number of changeover switches by means of which the machine can be set to perform the various arithmetic operations which it is capable, as set out in Table 1 hereinbelow. The period during which the terminal KA is energised is illustrated in FIGURE 2 and it will be seen that during this period there are six pulses appearing on the Z output of the pulse generator. Since the terminal T3 is energised, the six pulses appearing on the H line are applied to the input of the counting device 3R through the "AND" gate 3RG. Thus, as a result of the actuation of the number six key in the order of keys IK, the content of the counting device 3R is increased by six.

To ensure that the number registered in any counting device is increased by one each time the counting device of the next lower order passes on to or through a zero, a carry store CS is provided. This carry store is a two-state device which is set by a pulse transmitted thereto over a line C each time a counting device passes on to zero. When the carry store is set, its output CS0 is energised. The two-state device is unset by a P01 pulse applied thereto at the beginning of each cycle of the pulse generator PG through an "AND" gate CSG provided the other input of this gate, which is constituted by the output of an "OR" gate CSG1 having inputs M and A, is energised. When the carry store is unset, its output $\overline{C}$ is energised. However, the arrangement is such that the output CS0 of the carry store remains energised for a short period after the arrival of the P01 pulse by which it is unset. The output CS0 is connected to one of the inputs of the "AND" gate G9, another input to which is constituted by the P01 output from the gate CSG. The third input of the gate G9 is energised so long as the timer TR is not on T0 or T1. Accordingly a P0 pulse will appear on the H line if the carry store has been set during the preceding cycle of operation of the pulse generator PG. Thus a carry pulse will be applied to any of the counting devices 2R to 13R during the period of the timing device TR when its RG gate is open if the carry store has been set during the preceding period of the timing device TR. For example, a carry pulse will be applied to the counting device 2R during the period T2 if the carry store has been set during the period T1. The only counting device which can receive pulses and hence the only counting device which can pass through zero during the period T1 is the counting device 1R. Hence the counting device 2R can receive a carry pulse only from the counting device 1R and similarly each other counting device can only receive a carry pulse when the next lower counting device has passed through zero.

The components so far described are the majority of those necessary to enable the machine to perform addition and subtraction, but, when the machine is required to perform multiplication or division, it is necessary for the timing devices TR and TK to carry out a number of cycles and, to control the number of cycles of operation, a buffer counter BR is provided. The buffer counter BR has an output B which is energised when the buffer counter registers zero, and an output $\overline{B}$ which is energised when the buffer counter does not register zero. For the purposes of performing multiplication, a bank of multiplier keys MK is provided and each of the multiplier keys 9 to 2 is associated with a respective one of the outputs P1 to P8 of the pulse generator PG. Each of the multiplier keys 2 to 9, when operated, connects the corresponding output of the pulse generator PG to the multiplier key bank output terminal MR. When the multiplier key 1 is operated, it connects the output T13 of the timing device TR to the terminal MR. Also, when the 0 multiplier key is operated, or when none of the multiplier keys 1 to 9 are operated, the output T13 of the register timer is connected to the terminal MR. Normally the output terminal MR0 is at a positive potential, but, when the 0 multiplier key is operated, the potential of the terminal MR0 is made negative.

Normally, when the machine is switched on, the pulse generator PG is running continuously. However, the pulse generator can be stopped when a control signal is applied thereto from the output of one of the stop gates SG1 to SG4 through an "OR" gate SG5. Each of the stop gates SG1 to SG4 is in the form of an "AND" logical element and it will be seen that the inputs to the stop gate SG1 are constituted by the terminals T0, *t*11, M and *a* terminal ST2 which will be described hereinafter. The inputs to the stop gate SG2 are constituted by a terminal C+, the terminal B, a terminal D, the terminal *t*10, the terminal T0 and the terminal ST3. The inputs to the stop gate SG3 are constituted by the terminal B, the terminal M, the terminal T0 and the terminal ST3. The inputs to the stop gate SG4 are constituted by a terminal XT and the terminals B, T0, *t*13 and ST3. Assuming, for example, that the terminals M and ST3 are energised the pulse generator will be stopped if the buffer counter BR registers zero during the period T0.

The buffer counter BR may be a ring counter similar to the counting devices 1R to 13R. It is stepped from zero to nine and then direct to zero by means of input pulses received through an "AND" gate BRG2. The two inputs of the gate BRG2 are constituted by the H line and the output of an "OR" gate BRG1. The inputs of the "OR" gate BRG1 are constituted by the output of six "AND" gates BRG3 to BRG8. It will be seen that the inputs of the "AND" gate BRG3 are constituted by the terminals C+, D and a terminal $t\omega$, that the inputs of the "AND" gate BRG4 are constituted by the terminals C—, $t\omega$, D, Z and ST3, that the inputs of the "AND" gate BRG5 are constituted by the terminals ST3, C+, T0, P9, XT and a terminal $\overline{t11}$, that the inputs of the "AND" gate BRG6 are constituted by the terminals C—, $t\omega$ and XT, that the inputs of the "AND" gate BRG7 are constituted by the terminals $\overline{t11}$, C—, T0, M and ST3 and that the inputs of the "AND" gate BRG8 are constituted by the terminals $\overline{t11}$, ST3, T0, P9 and M. The terminal $\overline{t11}$ is energised at all times except during the period *t*11 and the terminal $t\omega$ constitutes the output of an "AND" gate CG8 which is energised during *t*13 unless the timing device TR is on T0 or T1. When the output of any of the "AND" gates BRG3 to BRG8 is energised, any pulses on the H line will be applied to the input of the buffer counter and the number registered by the counter will be increased by unity each time such a pulse appears.

It has already been pointed out that each order of keys can be associated with various ones of the counting devices since the timing devices TR and TK need not move in step. However, inaccuracies would be introduced into certain calculations if an order of keys were associated with a counting device of higher order than that order of keys. Accordingly to prevent such association, a bistable device BA is provided. This bistable device has two outputs A and $\overline{A}$. Normally the output A is positive and the other output is negative. However, the bistable device may be set by means of an output from the timing device TK which is arranged to occur at the end of the period *t*13. When the device is set, the output $\overline{A}$ is energised and the output A becomes negative. The device is reset by means of the trailing edge of the P9 pulse when the timing device TR is on T0. It will be seen that the terminal A constitutes one of the inputs of the gate KG1 so that no key can affect the output of the two-state device KC after the end of the period *t*13. Accordingly no pulses can be entered from the keys under normal conditions after the period *t*13.

When the machine is used for multiplication or division, a further bistable device BC is required. This device is operative, when the machine is being used for division, to determine whether the divisor is added to or subtracted from the dividend and it is provided with two outputs one of which is designated C+ and the other C—. It is also used in multiplication to control the supply of pulses to the buffer counter BR. In the unset state the output C— is positive, and in the set state the output C+ is positive. The device is unset at the beginning of a calculation by a negative potential from the terminal STX. This negative potential is removed when a multiplier key is operated and the bistable device is thereafter alternately set and unset each time the output of an "OR" gate CG1 becomes positive. The inputs of the "OR" gate CG1 are constituted by the outputs of six "AND" gates CG2 to CG7. It will be seen that the inputs of the "AND" gate CG2 are constituted by the terminals C+, T0 and D, that the inputs of the gate CG3 are constituted by the terminals $\overline{C}$, T0, D, ST3 and C—, that the inputs of the gate CG4 are constituted by the terminals, C—, XT, $t\omega$, P9, CS0, that the inputs of the gate CG5 are constituted by the terminals C+, XT, $t\omega$, P9 and B, that the inputs of the gate CG6 are constituted by the terminals C—, M, T0, ST3 and MR and that the inputs of the gate CG7 are constituted by the terminals C—, MR, P9 and M.

The machine being described is suitable for performing addition, subtraction, multiplication and division. Each of the first three of these functions may be performed in more than one way. For example, addition of a number into the register may be made either by operating the keys of the main keyboard or by operation of the multiplier keys. When the multiplier keys are used for the addition of a number into the register, the machine operates as a ten-key machine so that the first operation of a multiplier key inserts the respective number into the counting device 12R; the second operation of a multiplier key will insert the respective number into the counting device 11R, and so on. Similar considerations apply to subtraction and a number may be subtracted from the number in the register by operation either of the main keyboard or the multiplier keys.

The first way in which multiplication can be performed comprises the insertion of the multiplicand into the main keyboard and the insertion of successive digits of the multiplier in the multiplier keys. The product will normally be added to any number already standing in the register, but if desired, the product may be subtracted from the number in the register. In the second method of performing multiplication, the multiplicand is again entered in the main keyboard, but the multiplier is inserted in the register. The machine causes the product to appear in the register in place of the multiplier. Although in this process the machine treats the number entered on the keyboard as the multiplicand and the number shown in the register as the multiplier, it may be convenient in practice to regard the number in the register as the multiplicand and the number entered in the keyboard as the multiplier. This method of performing multiplication may then be used when it is desired to multiply a series of numbers together. In this case, the first number is entered in the register and then multiplied by the second number by entering the second number in the main keyboard. The product of this first multiplication which appears in the register may then be multiplied by the third number by entering the third number on the keys. The second product can then be multiplied by the fourth number, and so on.

In division, the dividend is entered in the register and the divisor is entered on the main keyboard. The machine then operates to replace the dividend in the register by the quotient. When it is required to divide a series of numbers by the same divisor, it is possible to leave the divisor set on the main keyboard and to enter each new dividend into the register by means of the multiplier keys as described above. In addition to performing the arithmetical processes already described, the machine can also be operated to shift the number in the register either to the left or to the right. The various functions which can be performed are selected by means of change-over switches. These switches are not shown in the drawing, but they operate to apply positive potentials to the terminals indicated in the following Table 1:

TABLE 1

| | | | | |
|---|---|---|---|---|
| Addition (1) | M | + | $\overline{XT}$ | $\overline{N}$ |
| Addition (2) | M | + | $\overline{XT}$ | N |
| Subtraction (1) | M | S | $\overline{XT}$ | $\overline{N}$ |
| Subtraction (2) | M | S | $\overline{XT}$ | N |
| Multiplication (1) | M | + | $\overline{XT}$ | $\overline{N}$ |
| Multiplication (2) | | + | XT | $\overline{N}$ |
| Division | D | + | $\overline{XT}$ | $\overline{N}$ |
| Left Shift | D | + | $\overline{XT}$ | N |
| Right Shift | | + | XT | N |

Actuation of the zero multiplier key MKO replaces the positive potential on terminal + or terminal S by the negative potential applied to the line MR0.

OPERATION

When the machine is in the waiting condition, the pulse generator PG is running and produces its normal ten pulses during each cycle of operation. However, these pulses are ineffective at this time because the timing device TR is maintained at T0 and accordingly none of the gate circuits 1RG to 13RG or BRG3, BRG4 or BRG6 is open. The timing device TR is maintained on T0 by a negative potential applied to it by the terminal ST2 which also constitutes one input of the gate SG1. A negative potential is also supplied by the terminal ST3 which serves to close the gates SG2, SG3, SG4, CG3, CG6, TG6, TG8, BRG5, BRG7 and BRG8. The bistable device BA is in the unset state with the output A energised and the bistable device BC is in the unset state with the output C— energised.

ADDITION (1)

When the machine is set to perform addition from the main keyboard, positive potentials are applied to the terminals M, $\overline{XT}$ and $\overline{N}$. Two milliseconds after any of the keys in the various orders of keys 1K to 10K have been depressed, the potential on the terminal ST2 becomes positive instead of negative and after a further eight milliseconds the terminal ST3 also becomes positive.

It will be assumed that the number 34 is to be added to the number 57. Before the start of the calculation, all the counting devices, including the buffer counter BR, will register zero. To insert 34 into the register, the number 3 key is depressed in the order 2K and the number 4 key is depressed in the order 1K. It is assumed in the following description that the two keys have been depressed simultaneously and that the 3 and the 4 are both added into the register during the same cycle of operation of the timing devices TR and TK. However, this is not the normal method of operating the machine since the operator will normally depress one key and then the other. In this case, the insertion of each digit into the register will occupy a separate cycle of operation of the timing devices TR and TK. It is irrelevant whether the higher order or the lower order key is depressed first.

When the keys are depressed, the negative potentials are removed from the two start terminals ST2 and ST3. As a result, the next P9 pulse produced by the pulse generator PG will step the timing device TR from T0 to T1. Nothing will happen during the next cycle of the pulse generator, except that the P9 pulse will step the timing device TR from T1 to T2 and the timing device TK from $t1$ to $t2$. Similarly, during the next cycle of the pulse generator the timing devices will merely step respectively to T3 and $t3$. Since the number 4 key is depressed in the order 1K and since the timing device TK is now on $t3$, the next P5 pulse from the pulse generator PG will pass through the gate 1KG to the line K. Accordingly, since the two-state device BA is in the unset condition with its output A energised, the trailing edge of the P5 pulse will be operative to change the two-state device KC over to its set state in which its output KA is energised. Accordingly, since the inputs M, + and KA of the gate G6 are all energised, the remaining four pulses appearing at the Z output of the pulse generator PG during this cycle of operation of the pulse generator will be passed through the gates G6 and G11 to the line H. Since the terminal T3 of the gate 3RG is energised, these four pulses will be passed through the gate 3RG and will step the counting device 3R from 0 to 4. The trailing edge of the P9 pulse will cause the two-state device KC to be returned to its unset state in which its output KB is energised. The same P9 pulse will also be operative to step the timing device TR from T3 to T4 and the timing device TK from $t3$ to $t4$. Accordingly, during the next cycle of operation of the pulse generator PG the gates 2KG and 4RG will be open. Since the number 3 key is depressed in the order of keys 2K, the P6 pulse will pass through the gate 2KG and its trailing edge will change the two-state device KC over to its set state in which the output KA is energised. Accordingly, the P7, P8 and P9 pulses of the cycle will be applied through the Z line, the gate G6, the gate G11, the H line and the gate 4RG, to the input of the counting device 4R to step it from 0 to 3. The trailing edge of the P9 pulse will change the two-state device KC back to its unset state and will also step the timing device TR to T5 and the timing device TK to *t*5. Since no key is depressed in the order of keys 3K, the two-state device KC will remain in its unset state during the next cycle of operation of the pulse generator and accordingly the gate G6 will remain closed. The pulse P9 during this cycle will step the timing device TR to T6 and the timing device TK to *t*6 and these processes will continue until the timing device TR has reached T0 and the timing device TK has reached *t*1. As has already been pointed out, when no multiplier key is operated, the terminal MR is connected to the output T13 of the timing device TR. Accordingly, during the period T13, a P9 pulse is applied to the bistable device BC through the gate CG7. As a result, the bistable device BC is set and its output C+ is energised in place of its output C—. Thus, it will be seen that all the gates BRG3 to BRG8 are closed throughout the calculation and no pulses are applied to the buffer counter BR. This counter was on zero at the start of the calculation and thus the terminal B remains energised throughout. When the timing device TR reaches T0, all the inputs of the stop gate SG3 are energised and after a predetermined delay period the pulse generator PG is stopped. The delay period referred to is not sufficient to allow the P9 pulse to be applied from the gate BRG8 to step the buffer counter BR off zero.

When the keys in the orders 1K and 2K are released the negative potential is restored to the start terminal ST3 so that the gate SG3 is closed and the pulse generator PG recommences its operation.

To perform the second stage of the calculation, the number 5 key in the order 2K is depressed and the number 7 key in the order 1K is depressed. This causes the negative potentials to be removed from the start contacts ST2 and ST3 and the timing device TR is allowed to step from T0 to T1 when it receives the next P9 pulse from the pulse generator PG. Again, nothing happens during the periods T1 and T2, but when the timing device TR reaches T3, since the number 7 key in the order 1K is depressed and since the timing device TK is on *t*3, the next P2 pulse from the pulse generator PG will pass through the gate 1KG to the line K. The trailing edge of the P2 pulse will change the two-state device KC over to its set state and the remaining seven pulses appearing at the Z output of the pulse generator PG during this cycle of operation of the pulse generator will be passed through the gates G6 and G11 to the line H. Since the terminal T3 of the gate 3RG is energised, these seven pulses will be passed through the gate 3RG and will step the counting device 3R from 4 to 9 and thence to 0 to 1. When the counting device 3R registers 0, a pulse is applied to the input of the carry store CS over the common carry line C. This pulse sets the carry store so that a positive potential appears on the terminal SC0. The P9 pulse at the end of this cycle of operation of the pulse generator PG will return the two-state device KC to its unset state and will also step the timing device TR from T3 to T4 and the timing device TK from *t*3 to *t*4. Since the terminals M and A are energised, the P0 pulse at the beginning of the next cycle of operation of the pulse generator PG passes through the gates CSG and G9 to the H line and, since the terminal T4 is energised, the pulse passes through the gate 4RG and steps the counting device 4R from 3 to 4. The PO1 pulse from the gate CSG also returns the carry store CS to its unset state. Since the number five key in the order of keys 2K is depressed, the P4 pulse during this cycle will pass through the gate 2KG to set the two-state device KC. Accordingly five further pulses will be applied to the input of the counting device 4R to step it from 4 to 9. Since no keys are depressed in the orders 3K to 10K, the two-state device KC will remain in its unset state during the next eight cycles of operation of the pulse generator PG and the gate G6 will remain closed. At the end of the period T13, the bistable device BA will be set and the pulse generator PG will be stopped during the period TO. When the keys 5 and 7 in the orders 2K and 1K are released, the pulse generator will restart. The register of the machine now reads 00000000091(00), which is the result of the addition of 34 to 57.

ADDITION (2)

When the machine is set to perform addition from the multiplier keys, positive potentials are applied to the terminals M,+,$\overline{XT}$, and N.

It will be again assumed that the number 34 is to be added to the number 57. Before the start of the calculation all the counting devices, including the buffer counter BR, will register zero. To insert 34 into the register the number 3 multiplier key is depressed with the result that the terminal MR is connected to the P7 output of the pulse generator PG and the negative potentials are removed from the start terminals ST2, ST3 and STX. The positive pulse appearing on the start terminal STX ensures that the bistable device BC is unset with its output C— energised. As a result of the removal of the negative potential from the start terminal ST2, the next P9 pulse produced by the pulse generator PG will step the timing device TR from T0 to T1. Nothing will happen during the next eleven cycles of the pulse generator except that in each cycle the P9 pulse will step the timing devices TR and TK on together so that eventually the timing device TR will be on T12 and the timing device TK will be on *t*12. It is to be noted that during the periods *t*1 to *t*11, the keys in the main keyboard can have no effect because the input $\overline{N}$ of each of the gates 1KG to 10KG has a negative potential on it. The input N to the gate SKG on the other hand has a positive potential applied to it and accordingly during the period *t*12 a P8 pulse is applied to the line K. The trailing edge of the P8 pulse will change the two-stage device KC over to its set state in which its output KA is energised. Accordingly, since the inputs M, + and KA of the gate G6 are all energised, the remaining pulse appearing at the Z output of the pulse generator PG during this cycle of operation of the pulse generator will be passed through the gates G6 and G11 to the line H. Since the terminal T12 of the gate 12RG is energised, this pulse will be passed through the gate 12RG and will step the counting device 12R from 0 to 1. The trailing edge of the P9 pulse of this cycle will cause the two-state device KC to be returned to its unset state in which its output KB is energised. The same P9 pulse will also be operative to step the timing device TR from T12 to T13 and the timing device TK from *t*12 to *t*13. The next P9 pulse causes the timing device TR to step from T13 to T0 and the timing device TK from *t*13 to *t*1. It is to be noted that the P9 pulse which steps the timing device TK from *t*13 to *t*1 passes through the gate TG7 while the timing device TK is on T13 and not through the gate TG4 as during the periods T1 to T12.

When the timing device TR is on T0, all the inputs of the gate BRG7 are energised and accordingly any pulses appearing on the H line during this period are applied to the buffer counter BR. Both inputs of the gate G10 are energised and accordingly, as previously explained, pulses appear on the H line as a result of the action of the —GD waveform. When the P7 pulse occurs during this cycle of operation of the pulse generator, all the inputs of the gate CG6 are energised and the trailing edge of this P7 pulse is used to set the bistable device BC so that its output C+ is energised in place of its output C—. Thus, after eight pulses have been applied to the input of the buffer counter BR the gate BRG7 is closed and no further pulses reach the buffer counter BR through this gate. However, the P9 pulse opens the gate BRG8 and one further pulse is applied to the buffer counter BR to step it from 8 to 9. The P9 pulse also steps the timing device TR from T0 to T1, but the timing device TK does not step at this stage. It is to be noted that the bistable device BA is set at the end of the period *t*13 so that its output A is energised in place of its output A, but the gate TG5 does not open because the input B is not energised. The bistable device BA is returned to its unset state by the trailing edge of the P9 pulse during the period T0.

During the next eleven cycles of the pulse generator the P9 pulse will again step the timing devices TR and TK on together so that eventually the timing device TR will be on T12 and the timing device TK will be on *t*12. During this period a P8 pulse will be applied to the line K through the gate SKG and its trailing edge will change the two-state device KC over to its set state in which its output KA is energised. Thus, one pulse will be passed through the gates G6 and G11 to the line H and since the terminal T12 of the gate 12RG is energised, this pulse will be passed through the gate 12RG to step the counting device 12R from 1 to 2. The P9 pulse of this cycle will unset the two-state device KC and will step the timing device TR from T12 to T13 and the timing device TK from *t*12 to *t*13. The next P9 pulse will step the timing device TR from T13 to T0 and the timing device TK from *t*13 to *t*1. When the timing device TR is on T0 a P9 pulse will be applied to the buffer counter BR through the gate BRG8 to step the buffer counter from 9 to zero.

It is to be noted that no pulses will be applied to the buffer counter through the gate BRG7 at this stage since the bistable device BC has remained on C+.

Since the buffer counter BR registers zero, the terminal B is positive and accordingly all the inputs of the stop gate SG3 are energised. However, the trailing edge of the P9 pulse which steps the buffer counter BR to zero steps the timing device TR from T0 to T1. As has already been stated, the stop gate SG3 operates only after a predetermined time delay and this time delay is sufficient to prevent the gate from stopping the pulse generator at this stage. Accordingly the timing devices TR and TK are again stepped in the manner just described and one more pulse is applied during the period T12 to the counting device 12R to step it from 2 to 3.

When the timing device TR is on T0 all the inputs of the stop gates SG3 will again be energised since the buffer counter BR is still on zero. This time all these inputs remain energised for long enough to enable the gate to stop the pulse generator PG. The pulse generator is stopped before a P9 pulse can be passed through the gate BRG8 to increase the registration of the buffer counter and before the P9 pulse can be passed through the gate TG5 to step on the timer TK. It is to be noted that the multiplier key is locked in the actuated position so long as the pulse generator is operating, but is automatically released when the pulse generator stops.

When the number 3 multiplier key is released, the start terminal ST3 becomes negative and the gate SG3 is closed so that the pulse generator PG restarts.

Since the bistable device BA is still on $\overline{A}$ and since the buffer counter BR is still on B, the first P9 pulse produced by the pulse generator PG after it restarts passes through the gate TG5 to step the timer TK from *t*1 to *t*2. The back edge of this P9 pulse also serves to unset the bistable device BA so that its output A is energised in place of its output $\overline{A}$ and no further P9 pulses can be passed through the gate TG5. The number 4 multiplier key is then depressed with the result that the negative potentials are again removed from the start contacts ST2, ST3 and STX. The positive pulse which appears on the start line STX unsets the bi-stable device BC so that its output C— is energised, and as a result of the removal of the negative potential from the start terminal ST2 the next P9 pulse steps the timing device TR from T0 to T1. During the next ten cycles of the pulse generator, the timing devices TR and TK will be stepped on together until the timing device TR is on T11 and the timing device TK is on *t*12. During the period *t*12, the P8 pulse will set the bi-stable device KC so that the P9 pulse will be applied to the line H through the gate G6. Since the terminal T11 of the gate 11RG is energised, this pulse will be passed through the gate 11RG and will step the counting device 11R from 0 to 1. When the timing device TR is on T0, all the inputs of the gate BRG7 are energised and accordingly pulses are applied to the buffer counter BR until the bistable device BC is set by the trailing edge of the P6 pulse which is applied thereto through the gate CG6 because the number 4 multiplier key has been actuated. Thus, seven pulses are applied to the buffer counter BR through the gate BRG7 and a further pulse is applied to this counter through the gate BRG8 to step it from 7 to 8. During the next cycle of operation of the two timing devices, a further pulse will be applied to the counter 11R to step it from 1 to 2 and a pulse will be applied through the gate BRG8 to step the buffer counter BR from 8 to 9. Thereafter, the counter 11R will be stepped from 2 to 3 and the buffer counter BR from 9 to 0. During the succeeding cycle a fourth pulse will be applied to the counter 11R and the pulse generator will then stop and the number 4 multiplier key will be released.

To enable the number 57 to be added into the same part of the register as the number 34, it is necessary to ensure that the timing devices TR and TK are in the same relative positions as they were when the entry of the number 34 was commenced. For this purpose, a key is depressed to apply a positive pulse to the timer TK. This pulse is arranged to set the timer TK to *t*1. Accordingly, if the number 5 multiplier key is now depressed, the machine will perform five cycles of operation during each of which one pulse will be applied to the counter 12R to step it from 3 to 8. When the number 5 multiplier key is released, the bistable device BA remains on $\overline{A}$ until one P9 pulse has been applied through the gate TG5 to step the timing device TK from *t*1 to *t*2. Thus, when the number 7 multiplier key is depressed, the machine will perform seven cycles of operation during each of which one pulse will be applied to the counter 11R under the control of the gate SKG to step the counter 11R from 4 to 1. Further, when the counting device 11R steps from 9 to 0 a pulse will be applied to the carry line C with the result that the carry store will be set. Since the carry store is set during the period T11 one pulse will be applied through the gate G9 to the line H during the next period T12. Thus, since the gate 12RG is open during this period one pulse will be applied to the counting device 12R to step it from 8 to 9. Thus, the register of the machine now reads 09100000000(00) which is the result of the addition 34 to 57.

SUBTRACTION (1)

When the machine is set to perform subtraction from the main keyboard a positive potential is applied to the terminal S instead of to the terminal +, but otherwise conditions are as for addition (1). Accordingly the gate G6 will be rendered inoperative, but the gates G7 and G8 will be opened when their remaining inputs are energised.

As an example, the subtraction of 17 from 34 will be described.

Initially the number 34 is entered into the counting devices 4R and 3R with the machine set for addition from the main keyboard in the same manner as in the example described above. The machine is then changed over to subtraction and the number 17 is inserted in the orders of keys 2K and 1K. Once again, it will be assumed that the two keys are depressed together, but it is to be understood that normally the operator will first depress the number one key in the order 2K and then the number seven key in the order 1K.

When the keys have been depressed, the negative potentials are removed from the start terminals ST2 and ST3 and as a result the next P9 pulse generated by the pulse generator PG will step the timing device TR from T0 to T1. Accordingly the next P0 pulse from the pulse generator PG will be applied through the gate G7 to the countign device 1R and will step it from 0 to 1. Further, since the bistable device KC is unset, the pulses P1 to P9 will pass through the gate G8 and likewise will be applied to the counting device 1R to step it from 1 to 0.

When the counting device 1R is stepped to 0, a pulse is applied to the input of the carry store CS over the common carry line C. This pulse sets the carry store so that a positive potential appears on the terminal CS0. Accordingly, the P01 pulse at the beginning of the next cycle passes through the gate G9 to the H line and, since the terminal T2 is energised, the pulse passes through the gate 2RG and steps the counting device 2R from 0 to 1. Further, since the terminal KB remains energised throughout this cycle, the pulses P1 to P9 will also be applied to the counting device 2R to step it from 1 to 0. Thus, the carry store is set and accordingly the P01 pulse at the beginning of the next cycle is applied to the counting device 3R to step it from 4 to 5. The pulses P1 and P2 will also be applied to the counting device 3R to step it from 5 to 7, but, since the number seven key in the order 1K is depressed, the trailing edge of the P2 pulse will change the two-state device KC over to its set state and will thus remove the positive potential from the terminal KB and close the gate G8. Accordingly, no further pulses during this cycle of operation of the pulse generator will be passed through the gate G8 to the counting device 3R. The P9 pulse will cause the two-state device KC to be returned to its unset state in which its output KB is energised, pulses P1 to P8 produced duruing the next cycle of to T4 and the timing device TK from *t*3 to *t*4.

Since the output KB of the two-state device KC is energised, pulses P1 to P8 produced during the next cycle of operation of the pulse generator PG will be passed through the gate G8 to the H line. Since the timing device TR is on T4 these pulses will be applied to the counting device 4R to step it from 3 to 0 and thence to 1. Since the number one key in the order 2K is depressed, the trailing edge of the P8 pulse will change the two-state device KC over to its set state and will thus remove the positive potential from the terminal KB and close the gate G8. Accordingly, the P9 pulse will not be passed through the gate G8.

Since the counting device 4R has passed through zero, the carry store is set and the P01 pulse at the beginning of the next cycle is applied to the counting device 5R. Further, since the terminal KB remains energised throughout this cycle, as no key has been depressed in the order of keys 3K, the pulses P1 to P9 will also be applied to the counting device 5R to step it from 1 to 0. The arrival of the counting device 5R at 0 will set the carry store CS and accordingly during the next cycle of operation the pulses P0 to P9 will be applied to the counting device 6R to step it from 0 to 0. Similar considerations apply to the devices 7R to 13R which will be stepped from 0 to 0 during the periods T7 to T13. At the end of the period T13 the timing device TR will be stepped to T0 and, since the buffer counter BR has remained on 0, all the inputs of the stop gate SG3 will be energised and the pulse generator PG will be stopped. When the keys 1 to 7 in the orders 2K and 1K are released, the pulse generator will restart. At the end of the calculation the register will read 0000000017(00) which is the result of subtracting 17 from 34.

SUBTRACTION (2)

When the machine is set to perform subtraction, from the multiplier keys, a positive potential is applied to the terminal S instead of to the terminal +, but otherwise conditions are as for addition (2). As an example, the subtraction of 17 from 34 will again be described.

Initially the number 34 is entered into counting devices 12R and 11R either from the orders of keys 10K and 9K with the machine set for addition from the main keyboard, or from the multiplier keys with the machine set for addition from the multiplier keys. The machine is then changed over to subtraction and the number 1 multiplier key is depressed. As a result the negative potentials are removed from the start terminals ST2, ST3 and STX. Accordingly the timing device TR steps from T0 to T1 and the next P0 pulse is applied through the gate G7 to step the counting device 1R from 0 to 1. Moreover, since the bistable device KC is unset, the pulses P1 to P9 will pass through the gate G8 and will step the counting device 1R from 1 to 0. When the counting device 1R is stepped to 0, the carry store CS is set and as a result the P01 pulse at the beginning of the next cycle steps the counting device 2R from 0 to 1. Moreover since the terminal KB remains energised throughout this cycle, the pulses P1 to P9 will also be applied to the counting device 2R to step it from 1 to 0.

Similar considerations apply to the counting devices 3R to 10R each of which will be stepped from 0 to 0 during a respective one of the periods *t*3 to T10. During the period T11 the counting device 11R will be stepped from 4 to 4. During the period T12 a carry pulse will step the counting device 12R from 3 to 4 and a further eight pulses will be passed through the gate G8 to step this counting device from 4 to 2. The P8 pulse during this cycle will set the bistable device KC and as a result the P9 pulse will not be passed through the gate G8. During the period T13 the carry pulse will be applied to the counting device 13R to step it from 0 to 1 and the pulses P1 to P9 applied through the gate G8 will step this counting device from 1 to 0.

Since the number 1 multiplier key is depressed, the terminal MR is connected to the terminal T13 and accordingly the P9 pulse at the end of this cycle is passed through the gate CG7 to set the bistable device BC so that its output C+ is energised in place of its output C−. Thus, no pulses are passed to the buffer counter BR at the beginning of the T0 cycle and this counter remains on 0 with its output B energised long enough for the stop gate SG3 to be effective to stop the pulse generator PG.

When the pulse generator stops, the number 1 multiplier key is automatically released and when the operator's finger is removed from the key the pulse generator PG restarts. Since the bistable device BA was set at the end of *t*13, and has not been unset, the first P9 pulse produced by the pulse generator after it restarts passes through the gate TG5 to step the timer TK from *t*1 to *t*2. The back edge of this P9 pulse also services to unset the bistable device BA.

The number 7 multiplier key is now depressed with the result that once again during the cycles T1 to T10 the counting devices 1R to 10R are each stepped from 0 to 0. During the period T11 the output *t*12 of the timing device TR is energised and accordingly the P8 pulse will be applied to the line K through the gate SKG so that eight pulses in addition to the carry pulse will be passed through the gate 11RG to step the counting device 11R from 4 to 3. During the period T12 a carry pulse and nine further pulses will be applied to the counting device 12R to step it from 2 to 2. During the period T13 ten pulses will be applied to the counting device 13R to step it from 0 to 0. When the timing device TR is on T0, all the inputs of the gate BRG7 are energised and accordingly pulses are applied to the buffer counter BR until the bistable device BC is set by the trailing edge of the P3 pulse which is applied thereto through the gate CG6 because the number 7 multiplier key has been actuated. Thus, four pulses are applied to the buffer counter BR through the gate BRG7 and a further pulse is applied to this counter through the gate BRG8 to step it from 4 to 5. During the next cycle of operation of the two timing devices a further nine pulses will be applied to the counter 11R to step it from 3 to 2, and a pulse will be applied through the gate BRG8 to step the buffer counter BR from 5 to 6. Thereafter the counter 11R will be stepped from 2 to 1 and the buffer counter from 6 to 7. During the next three cycles of operation the counter 11R will be stepped from 1 to 8 and the buffer counter from 7 to 0. In the cycle in which the counter 11R is stepped from 0 to 9 no carry is applied to the counter 12R and accordingly during this cycle only nine pulses are applied to the counter 12R so that it is stepped from 2 to 1. After the buffer counter has reached 0 the machine performs one further cycle in which nine pulses are applied to the counter 11R to step it from 8 to 7. The pulse generator PG will then stop and the number 7 multiplier key will be released.

The register will now read 01700000000(00) which is the result of the subtraction of 17 from 34.

MULTIPLICATION (1)

When the machine is to be used for multiplication of a multiplicand entered on the main keyboard by a multiplier entered digit by digit on the multiplier keys, the conditions are the same as for addition (1) except that the start terminal STX becomes positive in addition to the start terminals ST2 and ST3 when one of the multiplier keys MK is depressed. The keys in the various orders of keys 1K to 10K have no control over the start contacts under these conditions. Further, the main keyboard is converted from a key-responsive keyboard to a key-set keyboard. In other words, when a key in any of the orders of keys 1K to 10K is depressed, it will remain actuated until the calculation is complete.

As an example the multiplication of 34 by 17 will be described.

Initially the multiplicand 34 is set on the keys of the machine by the depression of the number three key in the order 10K and the number four key in the order 9K. The orders 10K and 9K are only given by way of example since the multiplicand can be set on any two consecutive orders of keys on the left-hand side of the machine. However, it will normally be set in the highest possible orders since, if either the multiplicand or the multiplier is long and the multiplicand is set too far to the right, one or more digits on the right-hand side of the quotient will be lost unnecessarily.

The two depressed keys will lock down as the machine is set for multiplication, but the machine will not start to operate since these keys no longer control the start contacts.

The first digit of the multiplier 17 is now entered into the multiplier keys by the depression of key 1 in the bank MK. This key locks down and the negative potential will be removed from the start contacts.

As a result the next P9 pulse produced by the pulse generator PG will step the timing device TR from T0 to T1. Since no keys are depressed in the orders 1K to 8K, no pulses will be applied to the H line during the next ten cycles of operation of the pulse generator PG. However, since the number four key in the order 9K has been depressed, the P5 pulse from the pulse generator PG will pass through the gate 9KG to the line K when the timing device TK is at $t11$ and the timing device TR is at T11.

The trailing edge of the P5 pulse will set the two-state device KC and accordingly the remaining four pulses appearing at the Z output of the pulse generator PG during this cycle of operation will be passed through the gates G6 and G11 to the line H. Since during this cycle of operation the timing device TR is on T11, these pulses will pass through the gate 11RG to step the counting device 11R from 0 to 4. Similarly during the next cycle of operation of the pulse generator PG the counting device 12R will be stepped from 0 to 3.

No pulses are entered into the register while the timing device TR is on T13, but at the end of the period $t13$ the bistable device BA is changed over so that its output $\bar{A}$ is energised.

Further, since the number 1 multiplier key is depressed, the terminal MR is connected to the terminal T13 and accordingly the P9 pulse at the end of this period is passed through the gate CG7 to change over the bistable device BC so that its output C+ is energised in place of its output C−. Thus, no pulses are passed to the buffer counter BR at the beginning of the T0 period and this counter remains on 0 with its output B energised long enough for the stop gate SG3 to be effective to stop the pulse generator PG.

When the pulse generator stops, the number 1 multiplier key is automatically released and when the operator's finger is removed from the key the pulse generator PG restarts. Since the bistable device BA was set at the end of the period $t13$ and has not been unset, the first P9 pulse produced by the pulse generator after it restarts passes through the gate TG5 to step the timer TK from $t1$ to $t2$. The back edge of this P9 pulse also serves to unset the bistable device BA.

The number 7 multiplier key is now depressed with the result that the timing device TR is stepped from T0 to T1. Since no keys are depressed in the orders 1K to 8K no pulses will be applied to the H line during the next nine cycles of operation of the pulse generator PG. However, since the number 4 key in the order 9K has been depressed, the P5 pulse from the generator PG will pass through the gate 9KG to the line K when the timing device TK is at $t11$ and the timing device TR is at T10.

During this period the P5 pulse from the pulse generator PG will pass through the gate 9KG to the line K and will set the two-state device KC. As a result four pulses will pass through the gate 10RG to the counting device 10R which will therefore be stepped from 0 to 4.

When the timing device TK is on $t12$, the timing device TR will be on T11 and accordingly three pulses will be passed through the gate 11RG to step the counting device 11R from 4 to 7. When the timing device TR is on T0, all the inputs of the gate BRG7 are energised, and accordingly, pulses applied to the buffer counter BR until the bistable device BC is set by the trailing edge of the P3 pulse which is applied thereto through the gate CG6 because the number 7 multiplier key has been actuated. Thus, four pulses are applied to the buffer counter BR through the gate BRG7 and a further pulse is applied to this counter through the gate BRG8 to step it from 4 to 5.

During the next cycle of operation the timing devices TR and TK are stepped together until the timing device TK is on $t11$ and the timing device TR is on T10. Four pulses are then added into the counting device 10R to step it from 4 to 8. Further while the timing device TK is on $t12$ and the timing device TR is on T11, three pulses are added into the counting device 11R to step it from 7 to 0. As a result of the arrival of the counting device 11R at 0 the carry store CS is set and, while the timing device TR is at T12, the P01 pulse is applied through the gate G9 to the counting device 12R which is accordingly stepped from 3 to 4. When the timing device TR reaches T0, the buffer counter BR is stepped from 5 to 6 by the P9 pulse through a gate BRG8.

The machine continues to perform repeated addition while the buffer counter BR is stepped up to 0. During the succeeding cycle a final addition is performed and, since the buffer counter is still on 0 at T0, a positive potential is applied through the gate SG3 to stop the pulse generator.

The multiplier number seven key is automatically released, allowing the pulse generator PG to restart. In addition the timing device TK is stepped from $t2$ to $t3$ so that the machine is ready to perform another stage of multiplication. The machine now registers 005780000000.

The various stages of the calculation are summarised in the following Table 2.

TABLE 2

| BR | 13 | 12 | 11 | 10 | 9 | BA | BC | T | t | |
|---|---|---|---|---|---|---|---|---|---|---|
| 0 | 0 | 0 | 0 | 0 | 0 | A | C− | 0 | 1 | 34 is entered on keys 10K and 9K but does not appear in register. |
| | | | | | | | | | 1 | Multiplier key 1 is depressed and machine starts. 34 is added in counting devices 12R and 11R. |
| | | | | | | | | 1 | | |
| 0 | 0 | 3 | 4 | 0 | 0 | A | C− | 12 | 12 | |
| | | | | | | | | 13 | 13 | At the end of $t13$ BA is changed over to $\bar{A}$ and at T13 and P9 pulse changes BC to C+. |
| 0 | 0 | 3 | 4 | 0 | 0 | $\bar{A}$ | C+ | | | |
| 0 | | | | | | | C+ | 0 | 1 | SG3 is energised so that the pulse generator stops. When PG restarts, TK is stepped from $t1$ to $t2$ and BA returns to A. |
| 0 | 0 | 3 | 4 | 0 | 0 | A | C+ | 0 | 2 | |
| | | | | | | | | | 2 | Multiplier key 7 is depressed, so that BC is changed to C− and PG starts, 34 is added in counting devices 11R and 10R. |
| 0 | 0 | 3 | 7 | 4 | 0 | A | C− | 1 | 12 | |
| 0 | 0 | 3 | 7 | 4 | 0 | $\bar{A}$ | C− | 12 | 13 | BA is changed over to $\bar{A}$. |
| 0 | 0 | 3 | 7 | 4 | 0 | $\bar{A}$ | C− | 0 | 2 | BR is stepped to 5. BC is changed to C+ at end of P3 and BA is changed to A at end of P9. |
| 5 | | | | | | A | C+ | | | |
| 5 | | | | | | | | 0 | 2 | As SG3 is not energised, 34 is added again in 11R and 10R and BR is stepped to 6. |
| 6 | 0 | 4 | 0 | 8 | 0 | A | C+ | 12 | 1 | |
| 7 | 0 | 4 | 4 | 2 | 0 | A | C+ | | | 34 is added again and BR is stepped to 7. |
| 8 | 0 | 4 | 7 | 6 | 0 | A | C+ | | | 34 is added again and BR is stepped to 8. |
| 9 | 0 | 5 | 1 | 0 | 0 | A | C+ | | | 34 is added again and BR is stepped to 9. |
| 0 | 0 | 5 | 4 | 4 | 0 | A | C+ | | | 34 is added again and BR is stepped to 0. |
| 0 | 0 | 5 | 7 | 8 | 0 | A | C+ | 11 | 12 | 34 is added again. |
| 0 | 0 | 5 | 7 | 8 | 0 | $\bar{A}$ | C+ | 12 | 13 | BA is changed to $\bar{A}$. |
| 0 | 0 | 5 | 7 | 8 | 0 | $\bar{A}$ | C+ | 0 | 2 | SG3 is energised so that PG stops. When PG restarts, TK is stepped from $t2$ to $t3$ and BA returns to A. |
| 0 | 0 | 5 | 7 | 8 | 0 | A | C+ | 0 | 3 | |

If there is a number in the register before the start of a multiplication, the product will normally be added to the number in the register. However, if desired, the product can be subtracted from the number in the register. To obtain this result, the machine is set for multiplication and subtraction so that a positive potential is applied to the terminal S instead of to the terminal +. As a result the gate G6 is closed and the gates G7 and G8 are opened. The sequence of events is then the same as in the multiplication operations described above, except that repeated subtractions are performed instead of repeated additions.

If a digit of the multiplier is 0, a negative potential appears on the terminal MR0 when the 0 multiplier key is depressed and this is arranged to make both the terminals + and S negative. Accordingly the gates G6, G7 and G8 are closed and no additions or subtractions can be made in any of the counting devices 1R to 13R. The gate TG5 will open when the pulse generator restarts so that the timing device TK will be moved forward one step. Accordingly, there will be no effect on the number in the register, but, if the 0 digit is followed by a further digit of the multiplier, the stepping of the timing device TK will be equivalent to multiplying the number in the register by 10.

To illustrate the manner in which digits of the multiplicand are dropped when it is beyond the capacity of the machine to deal with them, the various steps in the multiplication of 1234567890 by 1111111111 are given in Table 3. It will be seen that ten digits of the multiplier can be entered. However, when the pulse generator restarts after the tenth digit has been entered, the timing device TK is stepped to t11 when the timing device TR is on T0 and accordingly the gate SG1 stops the pulse generator PG as soon as a further multiplier key is depressed. The pulse generator PG will be running after the tenth stage of the multiplication has been completed and the depressed multiplier key has been released. However, if any further multiplier key is depressed the negative potential will be removed from the start contact ST2 and the gate SG1 will open. The output from this gate will stop the pulse generator and the depressed multiplier key will automatically be released without any change being made in the number in the register.

TABLE 3

| 13 | 12 | 11 | 10 | 9 | 8 | 7 | 6 | 5 | 4 | 3 | 2 | 1 | T | t | |
|---|---|---|---|---|---|---|---|---|---|---|---|---|---|---|---|
| 0 | 1 | 2 | 3 | 4 | 5 | 6 | 7 | 8 | 9 | 0 | 0 | 0 | 1–12 | 1–12 | 123456789000 is added into 12R to 1R. |
| 0 | 1 | 3 | 5 | 8 | 0 | 2 | 4 | 6 | 7 | 9 | 0 | 0 | 1–11 | 2–12 | 12345678900 is added into 11R to 1R. |
| 0 | 1 | 3 | 7 | 0 | 3 | 7 | 0 | 3 | 5 | 7 | 9 | 0 | 1–10 | 3–12 | 1234567890 is added into 10R to 1R. |
| 0 | 1 | 3 | 7 | 1 | 6 | 0 | 4 | 9 | 2 | 5 | 7 | 9 | 1–9 | 4–12 | 123456789 is added into 9R to 1R. |
| 0 | 1 | 3 | 7 | 1 | 7 | 2 | 8 | 3 | 8 | 2 | 6 | 7 | 1–8 | 5–12 | 12345678 is added into 8R to 1R. |
| 0 | 1 | 3 | 7 | 1 | 7 | 4 | 0 | 7 | 2 | 8 | 3 | 4 | 1–7 | 6–12 | 1234567 is added into 7R to 1R. |
| 0 | 1 | 3 | 7 | 1 | 7 | 4 | 1 | 9 | 6 | 2 | 9 | 0 | 1–6 | 7–12 | 123456 is added into 6R to 1R. |
| 0 | 1 | 3 | 7 | 1 | 7 | 4 | 2 | 0 | 8 | 6 | 3 | 5 | 1–5 | 8–12 | 12345 is added into 5R to 1R. |
| 0 | 1 | 3 | 7 | 1 | 7 | 4 | 2 | 0 | 9 | 8 | 6 | 9 | 1–4 | 9–12 | 1234 is added into 4R to 1R. |
| 0 | 1 | 3 | 7 | 1 | 7 | 4 | 2 | 0 | 9 | 9 | 9 | 2 | 1–3 | 10–12 | 123 is added into 3R to 1R. |
| 0 | 1 | 3 | 7 | 1 | 7 | 4 | 2 | 1 | 0 | 0 | 0 | 4 | 0 | 11 | Machine prevented from starting. |

MULTIPLICATION (2)

When the machine is to be used for multiplication of a multiplicand entered on the main keyboard by a multiplier stored in the register, positive potentials are applied to the terminals +, XT, and $\overline{N}$. As in multiplication (1), the keys in the various orders of keys 1K to 10K have no control over the start terminals and a special start key is provided which not only energises the terminals ST2, ST3 and STX, but also applies a pulse to the timer TK to set it to *t*10.

As an example, the multiplication of 34 by 17 will again be described.

If desired, the multiplier 17 may initially bet set into the register from the main keyboard with the machine set as for addition (1). The machine may then be set for multiplication (2) and the multiplicand entered on the main keyboard. Alternatively, the multiplicand may initially be set on the main keyboard and the multiplier inserted into the register by means of the multiplier keys as in addition (2). In practice, this method of performing multiplication will normally only be used when one of the two numbers to be multiplied is already standing in the register and a whole series of numbers may be multiplied together by inserting each new number into the main keyboard and retaining the previous product in the register.

For the present example it will be assumed that the number 34 has been inserted on the main keyboard by the actuation of the number 3 key in the order of keys 10K and the actuation of the number 4 key in the order of keys 9K. Further, it will be assumed that the digits 1 and 7 are standing in the counters 12R and 11R respectively.

When the special start key is depressed, the next P9 pulse produced by the pulse generator PG will step the timing device TR from T0 to T1. At this time the timing device TK is on *t*10 and, since no key is depressed in the order of keys 8K, no pulse will be applied to the K line during the first cycle of operation of the pulse generator. During the next cycle of operation the timing device TR will be at T2 and the timing device TK at *t*11 and, since the number 4 key is depressed in the order 9K, the P5 pulse from the pulse generator PG will pass through the gate 9KG to the line K and the trailing edge of this P5 pulse will set the two-state device KC. However, since the terminal M is not energised, the gate G6 will not open and no pulses will be applied to the H line. Similar considerations apply during the next cycle of operation of the pulse generator in which the timing device TR is on T3 and the timing device TK on *t*12. During the next cycle of operation of the pulse generator the timing device TR will be on T4 and the timing device TK on *t*13. At this time, since the terminal XT is enerfiised, and, since the bistable device BC and the carry store CS are unset, all the inputs of the gate G5 are energised and pulses will appear on the H line as a result of the action of the —GD waveform. Further, since both inputs of the gate CG8 are energised, a positive potential appears on the terminal *tω* and all the inputs of the gate BRG6 are energised. Thus, since the timing device TR is on T4, the pulses appearing on the H line during this cycle are applied to the counting device 4R and also to the buffer counter BR. Thus, ten pulses will be applied to the counter 4R to step it from 0 to 0 and ten pulses will be applied to the buffer counter BR to step it from 0 to 0.

When the counter 4R reaches 0, the carry store CS will be set. At the same time, the bistable device BA will be set so that its output $\overline{A}$ is energised in place of its output A. During the next nine cycles of operation, the timing device TR will be stepped to T13 and the timing device TK will be stepped round to *t*9. During the next cycle of operation the timing device TR will be stepped to T0, but during this period no pulse is applied through the gate TG7 to step the timing device TK since the terminal $\overline{XT}$ is not energised. At the end of this period, the bistable device BA will be unset by the DP9 pulse so that its output A is energised in place of its output $\overline{A}$. During the next cycle, the timing device TR will step from T0 to T1, but again, no stepping pulse will be applied to the timing device TK since the gate TG8 is closed because the bistable device BC is unset with its output C— energised. At the beginning of this period, the P0 pulse will be passed through the gate CSG to unset the carry store, but this pulse will not pass through to the line H since the input T2–T13 of the gate G9 is not energised. During the next four cycles of operation, the timing device TR will be stepped from T1 to T5 and the timing device TK from *t*9 to *t*13. The sequence of events will then be as described above for the period when the timing device TR was on T4 and the timing device on *t*13, since the counting device 5R is also on 0.

During the next cycle of the timing devices, T6 will coincide with *t*13 and the counting device 6R will be stepped from 0 to 0. Thereafter, the counting devices 7R to 10R will be stepped from 0 to 0 in the same way.

When T11 coincides with *t*13, however, the carry store CS will be set after three pulses have been applied to the counting devices 11R and BR since the counting device 11R will have been stepped from 7 to 0. Accordingly, the input $\overline{C}$ will be removed from the gate G5 and no further pulses will be applied to the H line during this cycle of operation of the pulse generator. The P9 pulse will pass through the gate CG4 since the input CS0 is energised and will switch the bistable device BC from C— to C+. The timer TR will then step to T12 and T13 and the timer TK will step to *t*1 and *t*2. No stepping pulse is applied to the timer TK when the timer TR steps from T13 to T0, but a stepping pulse is applied to the timer TK when the timer TR steps from T0 to T1 since the gate TGG8 will open because the bistable device BC is on C+. When the timing device TR is on T0, the P9 pulse will pass through the gate BRG5 to step the buffer counter from 3 to 4. The two timing devices will then step on in the same relative positions and eventually the timer TR will be on T9 and the timer TK will be on *t*11. During this cycle of the pulse generator, the P5 pulse will pass through the gate 9KG to the line K to set the two-state device KC. As a result, the remaining four pulses of this cycle will pass through the gate G2 to the line H and thence through the gate 9RG to the counting device 9R to step it from 0 to 4. During the next cycle of operation of the pulse generator, the timing device TR will be on T10 and the timing device TK on *t*12 and, since the number 3 key is depressed in the order of keys 10K, three pulses will be applied to the counting device 10R to step it from 0 to 3.

Since the bistable device BC is still on C+, the timing device TK and the buffer counter BR will both be stepped during T0. This sequence of events will continue with the two timing devices being stepped in the same relative positions and the count in the buffer counter BR being increased by one for each addition of 34 into the counting devices 10R and 9R until the buffer counter reaches 0. This will occur after the number 34 has been added into the register six times and the machine will perform one more addition during the periods *t*11 and *t*12. At *t*13 all the inputs of the gate CG5 will be energised and the bistable device BC will be switched to C—. The register will now read 01238000000(00). It is to be noted that since the bistable device BA is unset by the DP9 pulse during each T0 period, the carry store functions throughout these addition cycles to apply carry pulses through the gate G9 when necessary.

The timing device TR will now step to T12 and T13 and the timing device TK to *t*1 and *t*2. Thereafter, the timing device TR will step to T0 and T1, but no stepping pulses will be applied to the timing device TK during these periods since the gates TG7 and TG8 are closed. Thus, the timing devices will proceed with the period T2 coincident with the period *t*3 and eventually the timing device TK will reach *t*13 with the timing device TR on T12. During this cycle of operation of the pulse generator, the gates BRG6, G5 and 12RG will be open so that pulses will be applied to the counters 12R and BR.

result that the special start key is released and the pulse generator restarts. The register will now read

00578000000(00)

which is the result of multipling 34 by 17.

The various stages of the calculation are summarised in the following Table 4.

TABLE 4

| BR | 13 | 12 | 11 | 10 | 9 | BA | BC | CS | T | t | |
|---|---|---|---|---|---|---|---|---|---|---|---|
| 0 | 0 | 1 | 7 | 0 | 0 | A | C− | $\bar{C}$ | 0 | 10 | 17 is entered in counters 12R and 11R and 34 is entered on keys 10K and 9K. |
| 0 | 0 | 1 | 7 | 0 | 0 | $\bar{A}$ | C− | CS0 | 4 | 13 | Start key is depressed and 10 pulses are entered into 4R and BR causing CS to set. |
| 0 | 0 | 1 | 7 | 0 | 0 | A | C− | $\bar{C}$ | 0 | 9 | As BC is at C− no pulse to TK at T0. |
| 0 | 0 | 1 | 7 | 0 | 0 | $\bar{A}$ | C− | CS0 | 5 | 13 | 10 pulses added into counters 5R and BR. |
| 0 | 0 | 1 | 7 | 0 | 0 | $\bar{A}$ | C− | CS0 | 6 | 13 | 10 pulses added into counters 6R and BR. |
| 0 | 0 | 1 | 7 | 0 | 0 | $\bar{A}$ | C− | CS0 | 7 | 13 | 10 pulses added into counters 7R and BR. |
| 0 | 0 | 1 | 7 | 0 | 0 | $\bar{A}$ | C− | CS0 | 8 | 13 | 10 pulses added into counters 8R and BR. |
| 0 | 0 | 1 | 7 | 0 | 0 | $\bar{A}$ | C− | CS0 | 9 | 13 | 10 pulses added into counters 9R and BR. |
| 0 | 0 | 1 | 7 | 0 | 0 | $\bar{A}$ | C− | CS0 | 10 | 13 | 10 pulses added into counters 10R and BR. |
| 3 | 0 | 1 | 0 | 0 | 0 | $\bar{A}$ | C+ | CS0 | 11 | 13 | 3 pulses added into 11R and BR producing carry. BC changed to C+. |
| 4 | 0 | 1 | 0 | 0 | 0 | A | C+ | $\bar{C}$ | 0 | 2 | As BC at C+, pulse to TK at T0. 1 pulse to BR through BRG5. |
| 4 | 0 | 1 | 0 | 0 | 4 | A | C+ | $\bar{C}$ | 9 | 1 | 4 is added into 9R. |
| 4 | 0 | 1 | 0 | 3 | 4 | A | C+ | $\bar{C}$ | 10 | 12 | 3 is added into 10R. |
| 5 | 0 | 1 | 0 | 6 | 8 | $\bar{A}$ | C+ | $\bar{C}$ | 0–13 | 2–1 | 34 is added into 10R and 9R. |
| 6 | 0 | 1 | 1 | 0 | 2 | $\bar{A}$ | C+ | $\bar{C}$ | 0–13 | 2–1 | 34 is added into 10R and 9R. Carry into 11R. |
| 7 | 0 | 1 | 1 | 3 | 6 | $\bar{A}$ | C+ | $\bar{C}$ | 0–13 | 2–1 | 34 is added into 10R and 9R. |
| 8 | 0 | 1 | 1 | 7 | 0 | $\bar{A}$ | C+ | $\bar{C}$ | 0–13 | 2–1 | Do. |
| 9 | 0 | 1 | 2 | 0 | 4 | $\bar{A}$ | C+ | $\bar{C}$ | 0–13 | 2–1 | Do. |
| 0 | 0 | 1 | 2 | 3 | 8 | A | C+ | CS0 | 0–10 | 2–12 | 34 is added into 10R and 9R. BR stepped to 0. |
| 0 | 0 | 1 | 2 | 3 | 8 | $\bar{A}$ | C− | $\bar{C}$ | 11 | 13 | BC changed to C−. |
| 0 | 0 | 1 | 2 | 3 | 8 | A | C− | $\bar{C}$ | 0 | 2 | No pulse to TK at T0. |
| 9 | 0 | 0 | 2 | 3 | 8 | $\bar{A}$ | C+ | CS0 | 12 | 13 | 9 pulses into 12R and BR producing carry. |
| 0 | 0 | 0 | 2 | 3 | 8 | A | C+ | CS0 | 0 | 1 | Pulse into TK at T0. Also one pulse to BR through BRG5. |
| 0 | 0 | 0 | 5 | 7 | 8 | A | C+ | $\bar{C}$ | 1–11 | 2–12 | 34 is added into 11R and 10R. |
| 0 | 0 | 0 | 5 | 7 | 8 | $\bar{A}$ | C− | $\bar{C}$ | 12 | 13 | BC changed over to C−. |
| 0 | 0 | 0 | 5 | 7 | 8 | $\bar{A}$ | C− | CS0 | 13–13 | 1–13 | 10 pulses added into 13R and BR. |
| 0 | 0 | 0 | 5 | 7 | 8 | $\bar{A}$ | C− | $\bar{C}$ | 0 | 13 | Stop gate SG4 energised. |

Thus, the counter 12R will be stepped from 1 to 0 while the counter BR is stepped from 0 to 9 and the carry store will then be set with the result that the gate G5 is closed. The P9 pulse will pass through the gate CG4 to switch the bistable devices BC from C— to C+. The timer TR will then step to T13 and T0 and the timer TK to *t*1. When the timing device TR is on T0, the P9 pulse will pass through the gate BRG5 to step buffer counter BR from 9 to 0. The two timing devices will then step on in the same relative positions until the timer TR is on T10 and the timer TK is on *t*11. During this cycle of the pulse generator, four pulses will be applied to the counting device 10R to step it from 3 to 7. Similarly during the next cycle of the pulse generator, three pulses will be applied to the counting device 11R to step it from 2 to 5.

At *t*13, all the inputs of the gate CG5 will be energised and the bistable device BC will be switched to C—. The timing device TR will now step to T13 and the timing device TK to *t*1. Thereafter, the timing device TR will step to T0 and T1, but no stepping pulses will be applied to the timing device TK during these periods, since the gates TG7 and TG8 are closed. Thus, the timing devices will proceed with the period T2 coincident with the period *t*2 and eventually the timing device TK will reach *t*13 with the timing device TR on T13. Ten pulses will now be applied to each of the counters 13R and BR so that each will be stepped from 0 to 0. When the counter 13R reaches 0, the carry store CS will be set and at the end of the period *t*13 the bistable device BA will be set. The counting device TR will now step from T13 to T0 and, since the counting device TK remains on *t*13, all the inputs of the stop gate SG4 are energised and the pulse generator PG is stopped, with the

DIVISION

When the machine is to be used for division, the dividend is entered into the register and the divisor is entered on the keys. Division is performed by subtracting the divisor from the dividend until the dividend remainder goes negative, whereupon the divisor is added back once and is then in effect shifted one place to the right. This process takes place ten times after which the machine stops. The quotient is accumulated on the left-hand side of the register and, as the division proceeds, the least significant digits of the divisor are dropped off one by one in the same way as the digits of the multiplicand are dropped off in multiplication.

When the machine is to be used for division the terminals D, +, $\overline{XT}$ and $\overline{N}$ are energised. The start contacts are under the control of the multiplier keys and the keys in the orders of keys 1K to 10K are latched as in multiplication.

As an example, the division of 146 by 12 will be described,

Initially, the machine is set for addition (1) or addition (2) and the number 146 is entered into the counting devices 12R, 11R and 10R either by the depression of the key 1 in the order 10K, the key 4 in the order 9K and the key 6 in the order 8K, or by the successive depression of the multiplier keys 1, 4 and 6. The machine is now set for division and the divisor 12 is entered into the keys of the orders of keys 10K and 9K.

A divide key is now depressed to remove the negative potentials from the various start contacts. The next P9 pulse from the pulse generator PG steps the timing device TR from T0 to T1 and the following P0 pulse will be applied through the gate G4 to the counting device 1R and will step it from 0 to 1. The P0 pulse is able to pass through the gate G4 because the machine is set for division, because the bistable device BC is in the unset state in which its output C— is energised and because the timing device TR is on T1. Moreover, since the bistable device KC is unset, the pulses P1 to P9 will pass through the gate G1 to the counting device 1R to step it from 1 to 0.

When the counting device 1R registers 0, the carry store CS is set and accordingly the P0 pulse at the beginning of the next cycle passes through the gate G9 to step the counting device 2R from 0 to 1. The remaining nine pulses during this cycle step the counting device 2R from 1 to 0 and this process continues during the periods T3 to T9 so that the counting devices 3R to 9R are all stepped from 0 to 0. A further similar process occurs during the period T10 when the counting device 10R is stepped from 6 to 6.

During the period T11 the P0 pulse is entered into the counting device 11R through the gate G9 and the pulses P1 to P7 are applied to the counting device 11R through the gate G1. However, since the number two key in the order 9K is depressed, the bi-stable device KC will be set at the end of the P7 pulse and accordingly the terminal KB will be de-energized and the gate G1 closed. Thus, a total of eight pulses are entered into the counting device 11R to step it from 4 to 2. As the counting device 11R passes through 0, it will set the carry store CS and accordingly the P0 pulse at the beginning of the period T12 will step the counting device 12R from 1 to 2. Further, since the number one key in the order 10K is depressed, the pulses P1 to P8 will be applied to the counting device 12R to step it from 2 to 0. As the counting device 12R passes through 0, it sets the carry store CS so that during the period T13 one pulse is applied to the counting device 13R through the gate G9 and nine further pulses are applied to this counting device through the gate G1. Accordingly, the counting device 13R steps from 0 to 0 and sets the carry store CS. At this time the counting device TK is on $t13$ and accordingly all the inputs of the gate BRG4 are open from P1 to P9. Thus, nine pulses are applied to the buffer counter BR to step it from 0 to 9. At the end of the period $t13$ the bistable device BA is set so that its output A is de-energised and the gate G1 is closed. Thus, the register now reads 00260000000(00) and the buffer counter reads 9.

The next P9 pulse from the pulse generator steps the counting device TR from T13 to T0 and the counting device TK from $t13$ to $t1$. At the end of the period T0 the bistable device BA is unset so that its output A is again energised. The next p9 pulse steps the counting device TR to T1, but since the gate TG4 is closed while the counting device TR is on T0, the counting device TK remains on $t1$. Thus, during the following eleven cycles of operation the timing devices TK and TR remain in step and accordingly the machine performs a further subtraction operation similar to that just described. Further, when the pulses P0 to P8 are entered into the counting device 12R during the period T12 this counting device is left registering 9. Accordingly, the carry store CS is not set and the next P0 pulse is not applied to the counting device 13R which accordingly is also stepped to 9. Once again the carry store CS is not set. Nine pulses are applied to the buffer counter BR through BRG4 and at the end of the period $t13$ the bistable device BA is set. The register now reads 99060000000(00) and the buffer counter reads 8.

The carry store CS is not unset at the beginning of T0, since neither input of the "OR" gate CSG11 is energised. Therefore all the inputs of the gate CG3 are energised and at the end of T0 the bistable device BC is switched to C+. As a result the gates G1, G4 and G5 are disabled and the gates G2 and G3 are prepared. The timing devices TR and TK are driven on in step and no entries are made in the counting devices 1R to 10R during the periods of T1 to T10 since the gate G2 is closed by the negative potential on the terminal KA and the gate G3 is closed by the negative potential on the terminal $t13$. However, during the period T11, since the number two key is depressed in the order 9K, the trailing edge of the P7 pulse sets the bistable device KC. Thus, the terminal KA is energised and the pulses P8 and P9 pass through the gate G2 to step the counting device 11R from 0 to 2. Similarly, during the period T12 one pulse will be applied to the counting device 12R to step it from 9 to 0. Accordingly, the carry store CS will be set and the next P0 pulse will step the counting device 13R from 9 to 0 so that the carry store will again be set. This P0 pulse will also be applied to the buffer counter BR to step it from 8 to 9, since the gate BRG3 is open from the beginning of the period $t13$. Further, during this period pulses are applied to the H line through the gate G3 and these pulses are applied to the counter 13R through the gate 13RG and to the buffer counter BR through the gate BRG3. When the buffer counter reaches 0, the terminal $\overline{B}$ is de-energised and the gate G3 is closed. Since the buffer counter was registering 9, only one pulse is required to return it to 0 and only one pulse is applied to the counter 13R which thus steps from 0 to 1. Thus, the register now reads 10260000000(00) and the buffer counter reads 0.

The timing device TR is now stepped to T0 and the timing device TK is stepped to $t1$ because the gate TG7 is open. The next DP9 pulse steps the timer TR to T1 and, as the two-state device BC is still on C+, the P9 pulse passes through the gate TG6 and steps the timing device TK from $t1$ to $t2$. Since all the inputs of the gate CG3 are energised, the bistable device BC is unset at the end of the period T0 so that its output C— is energised instead of its output C+. Also at the end of the period T0 the bistable device BA is unset so that its output A is energised.

The machine now performs a further subtraction, but this time the order of keys 1K is associated with the counting device 2R, the order of keys 2K is associated with the counting device 3R, and so on. Ten pulses are entered into each of the counting devices 1R to 9R during the periods T1 to T9 ($t2$ to $t10$). During the period T10 the timing device TK is on $t11$ and accordingly eight (1+7) pulses are applied to the counting device 10R to step it from 6 to 4. Similarly, during the period T11 ($t12$) nine (1+8) pulses are added into the counting device 11R to step it from 2 to 1. Ten pulses are applied to the counting device 12R during the period T12 ($t13$) and at the same time nine pulses are applied to the buffer counter BR through the gate BRG4 to step it from 0 to 9. At the end of the period T12 ($t13$) the bistable device BA is set so that the gate G1 is closed and no carry pulse is applied to the counting device 13R because the carry store cannot be unset at the beginning of T13 since neither input of CSG1 is energised. The bistable device BA remains set during the period T13 and accordingly no pulses are applied to the counting device 13R. The register now reads 10140000000(00) and the buffer counter reads 9.

The machine performs two more subtractions similar to that just described and at the end of the second period T12 ($t13$) the register reads 19900000000(00) while the buffer counter reads 7. Since the carry store is not set at the beginning of T0, all the inputs of the gate CG3 are energised and at the end of T0 the bistable device BC is switched to C+. Accordingly 12 is added back into the counting device 11R and 10R in the manner explained above for the counting devices 12R and 11R. During the period T12, the timer TK is on $t13$ and the pulses P0 to P2 are applied to the counter 12R to step it from 9 to 2 and to the buffer counter BR to step it from 7 to 0.

When the timing device TR steps to T13, the timing device TK steps to *t*1. The register now reads 12020000000(00) and the buffer counter reads 0.

The next P9 pulse steps the timing device TR to T0 and the timing devime TK is *t*2. The *p*9 pulse is able to step the timing device TK because the gate TG7 is open. At the end of the period T0 the bistable device BC is unset so that its output C− is energised and the bistable device BA is unset so that its output A is energised. Further, because the gate TG6 is also open, the next P9 pulse steps the timer TR to T1 and the timer TK to *t*3.

The machine now performs a further series of subtractions but this time the order of keys 1K is associated with the counting device 1R, the order of keys 2K is associated with the counting device 2R, and so on. As result of the first subtraction, the register reads 12008000000(00) and at the end of the second substraction reads 12996000000(00). As there is no carry from the counter 11R, the bistable device BC is set to C+ at the end of T0 and 12 is added back into the counting devices 10R and 9R. The buffer counter reads 9 at the end of the first subtraction and 8 at the end of the second subtraction. After the add-back the nines complement of 8 (i.e. 1) is entered into the counting device 11R and the buffer counter is returned to 0. Thus, the register now reads 12108000000(00). The machine continues to perform a series of operations each consisting of repeated subtractions until the dividend remainder becomes negative followed by one addition. During the first of these operations the order of keys 2K is associated with the counting device 1R, the order of keys 3K is associated with the counting device 2R, and so on. These operations continue until the order of keys 8K is associated with the counting device 1R. As a result of the preceding stages of the calculation the register will read 12166666608(00) and the timing device TK will be on *t*9 when the timing device TR is on T0. The divisor (12) is now subtracted from the number standing in the counting devices 3R and 2R. The seventh subtraction causes the number in the register to go negative and the 12 is added back into the counting devices 3R and 2R. The last digit of the quotient to be caluclated is transferred from the buffer counter to the counting device 4R and thus the register now reads 12166666660(80). When the timing device TR is stepped to T0, the timing device TK is stepped to *t*10 and the gate SG2 is opened to stop the pulse generator PG. When the pulse generator stops, the divide key, which was depressed and latched down at the beginning of the calculation, is automatically released.

If it is now desired to perform a further calculation involving the same divisor, it is possible to leave the number 12 entered in the orders of keys 10K and 9K and, after removing the last quotient from the register by means of a clearing key, to enter a new dividend in the register by means of the multiplier keys as described above under the heading "Addition (2)." This process can, of course, be repeated as many times as required.

The various steps of the calculation just described are shown in the following Table 5.

TABLE 5

| BC | BR | 13 | 12 | 11 | 10 | 9 | 8 | 7 | 6 | 5 | 4 | 3 | 2 | T | t | |
|---|---|---|---|---|---|---|---|---|---|---|---|---|---|---|---|---|
| | | | | | | | | | | | | | | 0 | 1 | |
| − | 0 | 0 | 1 | 4 | 6 | 0 | 0 | 0 | 0 | 0 | 0 | 0 | 0 | 13 | 13 | 146 is entered in the register in orders 12R, 11R and 10R. |
| | | | | | | | | | | | | | | 0 | 1 | Set machine for division. Enter 12 in keys 10K and 9K and press Divide key. |
| | | | | | | | | | | | | | | 1 | 1 | |
| − | 9 | 0 | 0 | 2 | 6 | 0 | 0 | 0 | 0 | 0 | 0 | 0 | 0 | 13 | 13 | 12 is subtracted from 14 in 12R and 11R. Carry store set during T13 and nine pulses entered in BR. |
| | | | | | | | | | | | | | | 1 | 1 | |
| − | 8 | 9 | 9 | 0 | 6 | 0 | 0 | 0 | 0 | 0 | 0 | 0 | 0 | 13 | 13 | 12 is subtracted from 02 in 12R and 11R and nine pulses entered in BR. |
| + | 8 | 9 | 9 | 0 | 6 | 0 | 0 | 0 | 0 | 0 | 0 | 0 | 0 | 0 | 1 | No carry at T13 and therefore BC is changed over to C+. |
| | | | | | | | | | | | | | | 1 | 1 | |
| + | 8 | 9 | 0 | 2 | 6 | 0 | 0 | 0 | 0 | 0 | 0 | 0 | 0 | 12 | 12 | 12 is added to 90 in 12R and 11R. |
| + | 0 | 1 | 0 | 2 | 6 | 0 | 0 | 0 | 0 | 0 | 0 | 0 | 0 | 13 | 13 | 1+1 is added into 13R and BR. |
| | | | | | | | | | | | | | | 0 | 1 | |
| − | 0 | 1 | 0 | 2 | 6 | 0 | 0 | 0 | 0 | 0 | 0 | 0 | 0 | 1 | 2 | BC is changed over to C−and TK is stepped to *t*2. |
| | | | | | | | | | | | | | | 2 | 3 | |
| − | 9 | 1 | 0 | 1 | 4 | 0 | 0 | 0 | 0 | 0 | 0 | 0 | 0 | 12 | 13 | 12 is subtracted from 26 in 11R and 10R. Carry store set during T12 and 9 added in BR. |
| | | | | | | | | | | | | | | 1 | 2 | |
| − | 8 | 1 | 0 | 0 | 2 | 0 | 0 | 0 | 0 | 0 | 0 | 0 | 0 | 12 | 13 | 12 is subtracted from 14 in 11R and 10R. Carry at T12 and 9 added in BR. |
| | | | | | | | | | | | | | | 1 | 2 | |
| − | 7 | 1 | 9 | 9 | 0 | 0 | 0 | 0 | 0 | 0 | 0 | 0 | 0 | 12 | 13 | 12 is subtracted from 02 in 11R and 10R and nine pulses entered in BR. |
| + | 7 | 1 | 9 | 9 | 0 | 0 | 0 | 0 | 0 | 0 | 0 | 0 | 0 | 0 | 2 | No carry at T12 and BC is changed over to C+. |
| | | | | | | | | | | | | | | 1 | 2 | |
| + | 7 | 1 | 9 | 0 | 2 | 0 | 0 | 0 | 0 | 0 | 0 | 0 | 0 | 12 | 12 | 12 is added to 90 in 11R and 10R. |
| + | 0 | 1 | 2 | 0 | 2 | 0 | 0 | 0 | 0 | 0 | 0 | 0 | 0 | 12 | 13 | 1+2 is added into 12R and BR. |
| | | | | | | | | | | | | | | 0 | 2 | |
| − | 0 | 1 | 2 | 0 | 2 | 0 | 0 | 0 | 0 | 0 | 0 | 0 | 0 | 1 | 3 | BC is changed over to C−, and TK is stepped to *t*3. |
| | | | | | | | | | | | | | | 2 | 4 | |
| − | 9 | 1 | 2 | 0 | 0 | 8 | 0 | 0 | 0 | 0 | 0 | 0 | 0 | 11 | 13 | 12 is subtracted from 20 in 10H and 9R. Carry at T11 and 9 added in BR. |
| | | | | | | | | | | | | | | 1 | 3 | |
| − | 8 | 1 | 2 | 9 | 9 | 6 | 0 | 0 | 0 | 0 | 0 | 0 | 0 | 11 | 13 | 12 is subtracted from 08 in 10R and 9R and 9 added in BR. |
| + | 8 | 1 | 2 | 9 | 9 | 6 | 0 | 0 | 0 | 0 | 0 | 0 | 0 | 0 | 3 | No carry at T11 and therefore BC is changed over to C+. |
| | | | | | | | | | | | | | | 1 | 3 | |
| + | 8 | 1 | 2 | 9 | 0 | 8 | 0 | 0 | 0 | 0 | 0 | 0 | 0 | 10 | 12 | 12 is added to 96 in 10R and 9R. |
| + | 0 | 1 | 2 | 1 | 0 | 8 | 0 | 0 | 0 | 0 | 0 | 0 | 0 | 11 | 13 | 1+1 is added into 11R and BR. |
| | | | | | | | | | | | | | | 0 | 3 | |
| − | 0 | 1 | 2 | 1 | 0 | 8 | 0 | 0 | 0 | 0 | 0 | 0 | 0 | 0 | 4 | BC is changed over to C−, and TK is stepped to *t*4. |

TABLE 5—Continued

| BC | BR | 13 | 12 | 11 | 10 | 9 | 8 | 7 | 6 | 5 | 4 | 3 | 2 | T | t | |
|---|---|---|---|---|---|---|---|---|---|---|---|---|---|---|---|---|
| − | 0 | 1 | 2 | 1 | 6 | 6 | 6 | 6 | 6 | 6 | 0 | 8 | 0 | | | 12 is subtracted from 80 in 3R and 2R. Carry at T4 and 9 added in BR. |
| | | | | | | | | | | | | | | 1 | 10 | |
| − | 9 | 1 | 2 | 1 | 6 | 6 | 6 | 6 | 6 | 6 | 0 | 6 | 8 | 4 | 13 | |
| | | | | | | | | | | | | | | 1 | 10 | 12 is subtracted from 68 in 3R and 2R. Carry a_ T4 and 9 added in BR. |
| − | 8 | 1 | 2 | 1 | 6 | 6 | 6 | 6 | 6 | 6 | 0 | 5 | 6 | 4 | 13 | |
| | | | | | | | | | | | | | | 1 | 10 | 12 is subtracted from 56 in 3R and 2R. Carry at T4 and 9 added in BR. |
| − | 7 | 1 | 2 | 1 | 6 | 6 | 6 | 6 | 6 | 6 | 0 | 4 | 4 | 4 | 13 | |
| | | | | | | | | | | | | | | 1 | 10 | 12 is subtracted from 44 in 3R and 2R. Carry at T4 and 9 added in BR. |
| − | 6 | 1 | 2 | 1 | 6 | 6 | 6 | 6 | 6 | 6 | 0 | 3 | 2 | 4 | 13 | |
| | | | | | | | | | | | | | | 1 | 10 | 12 is subtracted from 32 in 3R and 2R. Carry at T4 and 9 added in BR. |
| − | 5 | 1 | 2 | 1 | 6 | 6 | 6 | 6 | 6 | 6 | 0 | 2 | 0 | 4 | 13 | |
| | | | | | | | | | | | | | | 1 | 10 | 12 is subtracted from 20 in 3R and 2R. Carry at T4 and 9 added in BR. |
| − | 4 | 1 | 2 | 1 | 6 | 6 | 6 | 6 | 6 | 6 | 0 | 8 | 0 | 4 | 13 | |
| | | | | | | | | | | | | | | 1 | 10 | 12 is subtracted from 08 in 3R and 2R. 9 added in BR. |
| − | 3 | 1 | 2 | 1 | 6 | 6 | 6 | 6 | 6 | 6 | 9 | 9 | 6 | 4 | 13 | |
| | | | | | | | | | | | | | | 1 | 10 | No carry at T4 and therefore BC is changed over to C+. |
| + | 3 | 1 | 2 | 1 | 6 | 6 | 6 | 6 | 6 | 6 | 9 | 9 | 6 | 4 | 13 | |
| | | | | | | | | | | | | | | 1 | 10 | 12 is added to 08 in BR to 2R. |
| + | 3 | 1 | 2 | 1 | 6 | 6 | 6 | 6 | 6 | 6 | 9 | 0 | 8 | 3 | 12 | |
| | | | | | | | | | | | | | | 1 | 10 | 1+6 is added into 4R and BR. |
| + | 0 | 1 | 2 | 1 | 6 | 6 | 6 | 6 | 6 | 6 | 6 | 0 | 8 | 4 | 13 | |
| | | | | | | | | | | | | | | 1 | 10 | Gate SG2 is opened to stop the machine. |
| + | 0 | 1 | 2 | 1 | 6 | 6 | 6 | 6 | 6 | 6 | 6 | 0 | 8 | 10 | 0 | |

SHIFT

The machine may be caused to move a number in the register to the left or right by performing operations which are equivalent to multiplication (2) and division respectively.

RIGHT SHIFT

To illustrate the manner in which a number is shifted to the right, it will be assumed that the number 123 is standing in the counting devices 12R, 11R and 10R. Positive potentials are applied to the terminals + and XT as in multiplication, (2), but, since the main keyboard is not required for the shift process, the terminal N is energised in place of the terminal $\overline{N}$. Consequently, the machine functions as though the number one key had been depressed in the order of keys 10K.

As in multiplication (2) the shift operation is initiated by depressing the special start key so that the timer TK is set to *t*10 at the beginning of the operation.

When the timer TK reaches *t*12, the timer TR will be on T3 and at this time the P8 pulse will pass through the gate SKG to the line K and the trailing edge of this pulse will set the two-state device KC. However, since the gate G6 is closed, no pulses will be applied to the H line. During the next cycle of operation, however, when the timing device TR is on T4 and the timing device TK is on *t*13, the gates G5 and BRG6 open so that ten pulses are applied to the counter 4R to step it from 0 to 0 and ten pulses are applied to the buffer counter BR to step it from 0 to 0. When the counter 4R reaches 0, the carry store CS is set and at the same time the bistable device BA is set.

During the next nine cycles of the pulse generator the timing device TR will be stepped to T13 and the timing device TK to *t*9. During the next cycle of operation the timing device TR will be stepped to T0, but during this period no pulse is applied to the timing device TK. At the end of this period the bi-stable device BA is unset. During the next cycle the timing device TR will step from T0 to T1, but again no stepping pulse will be applied to the timing device TK. At the beginning of this period the carry store will be unset, but no pulse appears on the H line because the gate G9 is closed. During the next three cycles of operation the timing device TR will be stepped from T1 to T4 and the timing device TK from *t*9 to *t*12. The sequence of events will then be as described above for the period when the timing device TR was on T3 and the timing device TK on *t*12. Similarly, when the timing device TR is on T5 and the timing device TK on *t*13, the counting devices 5R and BR will be stepped from 0 to 0 in the same way as described with reference to the counter 4R.

During the next cycle of the timing devices, T6 will coincide with *t*13 and the counting device 6R will be stepped from 0 to 0. Thereafter the counting devices 7R to 9R will be stepped from 0 to 0 in the same way.

When T10 coincides with *t*13, however, the carry store CS will be set after seven pulses have been applied to the counting devices 10R and BR since the counting device 10R will have stepped from 3 to 0. Accordingly the input $\overline{C}$ will be removed from the gate G5 and no further pulses will be applied to the H line during this cycle of operation of the pulse generator so that the buffer counter will register 7. The P9 pulse will pass through the gate CG4 and switch the bi-stable device BC from C− to C+. The timer TR will then step to T11, T12 and T13 and the timer TR will step to *t*1, *t*2 and *t*3. No stepping pulse is applied to the timer TK when the timer TR steps from T13 to T0, but a stepping pulse is applied to the timer TK when the timer TR steps from T0 to T1 since the gate TG8 will open because the bi-stable device BC is on C+. When the timing device TR is on T0, the P9 pulse will pass through the gate BRG5 to step the buffer counter BR from 7 to 8. The two timing devices will then step up in the same relative positions until the timer TR is on T9 and the timer TK is on *t*12. During this cycle of the pulse generator the P8 pulse will pass through the gate SKG to set the two-state device KC. As a result the P9 pulse will pass through the gate G2 to the line H and thence through the gate 9RG to the counting device 9R to step it from 0 to 1. During the next cycle of operation of the pulse generator the timing device TK will be on *t*13 but since the bistable device BC is on C+ no pulses are applied to the buffer counter BR from the gate BRG6. However, when the timing device TR reaches T0, one pulse will be applied to the buffer counter BR through the gate BRG5.

This sequence of events will continue with the two timing devices being stepped in the same relative positions and the count in the buffer counter BR being increased by unity for each addition of unity in the counting device 9R until the buffer counter reaches 0. This will occur after the number one has been added into the counting device 9R twice and the machine will perform one more addition during the period *t*12. At *t*13 all the inputs of the gate CG5 will be energised and the bistable device BC will be switched to C—. The register will now read

01203000000(00)

The timing device TR will now step to T11, T12 and T13 and the timing device TK to *t*1, *t*2 and *t*3. Thereafter the timing device TR will step to T0 and T1, but no stepping pulses will be applied to the timing device TK during these periods since the gates TG7 and TG8 are closed. Thus the timing devices will proceed with the period T2 coincident with the period *t*4 and eventually the timing device TK will reach *t*13 with the timing device TR on T11. During this cycle of operation of the pulse generator the gates BRG6, G5 and 11RG will be open so that pulses will be applied to the counters 11R and BR. Thus the counter 11R will be stepped from 2 to 0 while the counter BR is stepped from 0 to 8 and the carry store will then be set with the result that the gate G5 is closed. The P9 pulse will pass through the gate CG4 to switch the bistable device BC from C— to C+. The timer TR will then step to T12, T13 and T0 and the inner TK to *t*1 and *t*2. When the timing device TR is T0, the P9 pulse will pass through the gate BRG5 to step the buffer counter from 8 to 9. The two timing devices will then step on in the same relative positions until the timer TR is on T10 and the timer TK is on *t*12. During this cycle of the pulse generator one pulse will be applied to the counting device 10R to step it from 0 to 1. Similarly when the timing device TR is next on T0, the buffer counter BR will be stepped from 9 to 0 and, when the timing device TR reaches T10, the counting device 10R will be stepped from 1 to 2. The register will now read 01023000000(00).

During the next cycle of operation of the pulse generator the timing device TK will be on *t*13 and all the inputs of the gate CG5 will be energized so that the bistable device BC is switched to C—. No stepping pulses will be applied to the timer TK during the following periods T13 and T0 and thus the timing devices will proceed with the period T2 coincident with the period *t*3 and eventually the timing device TK will reach *t*13 with the timing device TR on T12. Pulses will be applied to the counters 12R and BR and the counter 12R will step from 1 to 0 while the counter BR is stepped from 0 to 9. The bistable device BC will then be switched from C— to C+ and when the timing device TR is next on T0 the buffer counter will be stepped from 9 to 0. During the next period T11 one pulse will be applied to the counting device 11R to step it from 0 to 1. The register will now read 00123000000(00).

At *t*13 the bistable device will be switched to C— and the timing device TR will then step to T13 and the timing device TK to *t*1. Thereafter the timing device TR will step to T0 and T1, but no stepping pulses will be applied to the timing device TK since the gates TG7 and TG8 are closed. Thus the timing devices will proceed with the period T2 coincident with the period *t*2 and eventually the timing device TK will reach *t*13 with the timing device TR on T13. Ten pulses will now be applied to each of the counters 13R and BR so that each will be stepped from 0 to 0. When the buffer counter BR reaches 0, the terminal B will be energised. The counting device TR will now step to T0 and, since the counting device TK remains on *t*13, all the inputs of the stop gate SG4 are energised. The pulse generator PG is stopped with the result that the special start key is released and the pulse generator restarts.

It will be seen that the effect of the above operation has been to shift the number 123 from the counting devices 12R, 11R and 10R into the counting devices 11R, 10R and 9R. The various stages of the calculation are summarised in the following Table 6:

TABLE 6

| BR | 13 | 12 | 11 | 10 | 9 | BA | BC | CS | T | t | |
|---|---|---|---|---|---|---|---|---|---|---|---|
| 0 | 0 | 1 | 2 | 3 | 0 | A | C— | $\bar{C}$ | 0 | 10 | 123 is entered in counters 12R, 11R and 10R. |
| 0 | 0 | 1 | 2 | 3 | 0 | A | C— | CS0 | 4 | 13 | Start key is depressed and ten pulses are added into 4R and BR setting CS. |
| 0 | 0 | 1 | 2 | 3 | 0 | $\bar{A}$ | C— | CS0 | 5 | 13 | Ten pulses added into counters 5R and BR. |
| 0 | 0 | 1 | 2 | 3 | 0 | $\bar{A}$ | C— | CS0 | 6 | 13 | Ten pulses added into counters 6R and BR. |
| 0 | 0 | 1 | 2 | 3 | 0 | $\bar{A}$ | C— | CS0 | 7 | 13 | Ten pulses added into counters 7R and BR. |
| 0 | 0 | 1 | 2 | 3 | 0 | $\bar{A}$ | C— | CS0 | 8 | 13 | Ten pulses added into counters 8R and BR. |
| 0 | 0 | 1 | 2 | 3 | 0 | $\bar{A}$ | C— | CS0 | 9 | 13 | Ten pulses added into counters 9R and BR. |
| 7 | 0 | 1 | 2 | 0 | 0 | $\bar{A}$ | C+ | CS0 | 10 | 13 | Seven pulses added into 10R and BR producing carry. BC changed to C+. |
| 8 | 0 | 1 | 2 | 0 | 0 | A | C+ | $\bar{C}$ | 7 | 3 | As BC is on C+ pulse to TK at T0. One pulse to BR through BRG5. |
| 8 | 0 | 1 | 2 | 0 | 1 | A | C+ | $\bar{C}$ | 9 | 12 | One pulse added into 9R. |
| 9 | 0 | 1 | 2 | 0 | 1 | A | C+ | $\bar{C}$ | 0 | 3 | One pulse added into BR. |
| 9 | 0 | 1 | 2 | 0 | 2 | A | C+ | $\bar{C}$ | 9 | 12 | One pulse added into 9R. |
| 0 | 0 | 1 | 2 | 0 | 2 | A | C+ | $\bar{C}$ | 0 | 3 | One pulse added into BR. |
| 0 | 0 | 1 | 2 | 0 | 3 | A | C+ | $\bar{C}$ | 9 | 12 | One pulse added into 9R. |
| 0 | 0 | 1 | 2 | 0 | 3 | $\bar{A}$ | C— | $\bar{C}$ | 10 | 13 | BC changed to C—. |
| 0 | 0 | 1 | 2 | 0 | 3 | A | C— | $\bar{C}$ | 0 | 3 | As BC is on C— no pulse to TK at T0. |
| 8 | 0 | 1 | 0 | 0 | 3 | $\bar{A}$ | C+ | CS0 | 11 | 13 | Eight pulses added into 10R and BR producing carry. BC changed to C+. |
| 9 | 0 | 1 | 0 | 0 | 3 | A | C+ | $\bar{C}$ | 0 | 2 | One pulse added into BR. |
| 9 | 0 | 1 | 0 | 1 | 3 | A | C+ | $\bar{C}$ | 10 | 12 | One pulse added into 10R. |
| 0 | 0 | 1 | 0 | 1 | 3 | A | C+ | $\bar{C}$ | 0 | 2 | One pulse added into BR. |
| 0 | 0 | 1 | 0 | 2 | 3 | A | C+ | $\bar{C}$ | 10 | 12 | One pulse added into 10R. |
| 0 | 0 | 1 | 0 | 2 | 3 | $\bar{A}$ | C— | $\bar{C}$ | 11 | 13 | BC changed to C—. |
| 0 | 0 | 1 | 0 | 2 | 3 | A | C— | $\bar{C}$ | 0 | 2 | As BC is at C— no pulse to TK on T0. |
| 9 | 0 | 0 | 0 | 2 | 3 | $\bar{A}$ | C+ | CS0 | 12 | 13 | Nine pulses added into 12R and BR producing carry. BC changed to C+. |
| 0 | 0 | 0 | 0 | 2 | 3 | A | C+ | $\bar{C}$ | 0 | 1 | One pulse added into BR. |
| 0 | 0 | 0 | 1 | 2 | 3 | A | C+ | $\bar{C}$ | 11 | 12 | One pulse added into 11R. |
| 0 | 0 | 0 | 1 | 2 | 3 | $\bar{A}$ | C— | $\bar{C}$ | 12 | 13 | BC changed to C—. |
| 0 | 0 | 8 | 1 | 2 | 3 | $\bar{A}$ | C— | $\bar{C}$ | 0 | 1 | As BC is at C— no pulse to TK at T0. |
| 0 | 0 | 0 | 1 | 2 | 3 | $\bar{A}$ | C— | CS0 | 13 | 13 | Ten pulses added into counters 13R and BR. |
| 0 | 0 | 0 | 1 | 2 | 3 | $\bar{A}$ | C— | $\bar{C}$ | 0 | 13 | Gate SG4 energised to stop PG. |

LEFT SHIFT

To illustrate the manner in which the machine operates to shitf a number in the register one place to the left, it will again be assumed that the number 123 is standing in the counting devices 12R, 11R and 10R. As in the case of division, the terminals D, + and $\overline{XT}$ are energized, but as in right shift, the terminal N is energized in place of the terminal $\overline{N}$.

To initiate the shifft operation, the divide key is depressed and when the timing device TR is on T1, the P0 pulse will be applied through the gate G4 to stop the counting device 1R from 0 to 1. Moreover, the pulses P1 to P9 will pass through the gate G1 to step the counting device 1R from 1 to 0.

When the counting device 1R registers 0, the carry store CS is set and accordingly the P0 pulse at the beginning of the next cycle steps the counting device 2R from 0 to 1. Again, the pulses P1 to P9 step the counting device 2R from 1 to 0 and this process continues during the periods T3 to T9 so that the counting devices 3R to 9R are all stepped from 0 to 0. Further, similar processes occur during the periods T10 and T11 when the counting device 10R is stepped from 3 to 3 and the counting device 11R is stepped from 2 to 2.

During the period T12, the P0 pulse is entered into the counting device 12R through the gate G9 and the pulses P1 to P8 are applied to the counting device 12R through the gate G1. However, the P8 pulse will be passed through the gate SKG to the K line and the bistable device KC will be set at the end of this P8 pulse. Accordingly, the terminal KB will be deenergised and the gate G1 closed. Thus, a total of nine pulses are entered into the counting device 12R to step it from 1 to 0. When the counting device 12R reaches 0, it will set the carry store CS and accordingly the P0 pulses at the beginning of the period T13 will step the counting device 13R from 0 to 1. Nine further pulses are applied to the counting device 13R through the gate G1, so that the carry store is set at the end of the period T13. During the period T13, the counting device TK is on $t13$ and accordingly all the iputs of the gate BRG4 are open from P1 to P9, so that nine pulses are applied to the buffer counter BR to step it from 0 to 9.

The next P9 pulse from the pulse generator steps the counting device TR from T13 to T0 and the counting device TK from $t13$ to $t1$ and thereafter the counting device TR is stepped to T1, but the counting device TK remains on $t1$. Thus, the timing devices TK and TR remain in step and when the counting device TR reaches T12, nine pulses are entered into the counting device 12R which accordingly is left registering 9. Thus, the carry store CS is not set and the next P0 pulse is not applied to the counting device 13R which accordingly is also stepped to 9. Once again, the carry store CS is not set. Nine pulses are applied to the buffer counter BR through the gate BRG4 to step it from 9 to 8. All the inputs of the gate CG3 are energised during T0 and at the end of this period the bistable device BC is switched to C+. As a result, the gates G1, G4 and G5 are disabled and the gates G2 and G3 are prepared. The timing devices TR and TK are driven on in step and no entries are made in the counting devices 1R to 11R during the periods T1 to T10, since the gate G2 is closed by the negative potential on the terminal KA and the gate G3 is closed by the negative potential on the terminal $t13$. However, during the period T12, the trailing edge of the P8 pulse sets the bistable device KC and the P9 pulse passes through the gate G2 to step the counting device 12R from 9 to 0. Accordingly the carry store CS will be set and the next P0 pulse will set the counting device 13R from 9 to 0, so that the carry store will again be set. This P0 pulse will also be applied to the buffer counter BR to step it from 8 to 9, since the gate BRG3 is open. Further, during this period, pulses are applied to the H line through the gate G3 and these pulses are applied to the counters 13R and BR.

However, since the buffer counter was registering 9, the terminal $\overline{B}$ is de-energized after only one pulse and the gate G3 is closed. Thus, the counter 13R is stepped from 0 to 1. The register now reads 10230000000(00) and the buffer counter rears 0.

The timing device TR is now set to T0 and T1 and since the gates TG6 and TG7 are open, the timing device TK is stepped to $t1$ and $t2$. The bistable devices BC and BA are unset at the end of the period T0.

The machine now performs a further operation similar to that described above and which is analogous to the subtraction operation performed in division. This time, however, the timing device TR is on T11 when the timing device TK is on $t12$ and accordingly nine pulses are added into the counting device 11R to step it from 2 to 1. Ten pulses are applied to the counting device 12R during the period T12 ($t13$) and at the same time nine pulses are applied to the buffer counter BR to step it from 0 to 9. At the end of this period, the bistable devices BA and CS are set, but no carry pulse is applied to the counting device 13R because the carry store CS cannot be unset at the beginning of the period T13. Similarly the bistable device BA remains set throughout the period T13 and accordingly no pulses are applied to the counting device 13R. The register now reads 10130000000(00) and the buffer counter reads 9.

The machine performs two more subtractions similar to that just described and at the end of the second period T12 ($t13$) the register reads 19930000000(00) while the buffer counter reads 7. Since the carry store is not set at the beginning of T0, the bistable device BC is switched to C+ and accordingly unity is added back into the counting device 11R during the period T11 ($t12$) in the manner explained above for the counting device 12R. During the period T12 ($t13$), the pulses P0 to P2 are applied to the counter 12R to step it from 9 to 2 and to the buffer counter BR to step it from 7 to 0. The register now reads 12030000000(00) and the buffer counter reads 0.

The timing device TR now steps to T13, T0 and T1, and since the gates TG6 and TG7 are open, the timing device TR steps to $t1$, $t2$ and $t3$. The machine now performs a further series of subtractions, but this time during each operation unity is subtracted from the number in the counting device 10R. As a result of four such subtractions, the register reads 12990000000(00) and the buffer counter reads 6. The bistable device BC is then set to C+ and unity is added back into the counting device 10R which is thus stepped from 9 to 0. The resulting carry causes the counting device 11R also to step from 9 to 0. After the addback, the nines complement of 6 (i.e. 3) is entered into the counting device 11R and the buffer counter is returned to 0.

The machine now operates to subtract unity from the number in the counting device 9R, but since this number is 0, there is no carry from the counter 9R and the bistable device BC is set to C+ after only one subtraction. Accordingly, unity is added back into the counting device 9R to return it to 0. Further, since the buffer counter reads 9 at the end of the subtraction, 0 (i.e. the nines complement of 9) is entered into the counting device 10R and the buffer counter is returned to 0.

The machine continues to subtract and add unity to each of the counting devices 8R to 3R, and to transfer the nines complement of 9 (i.e. 0) into the counting devices 9R to 4R, but after the transfer from the buffer counter to the counting device 4R, the timing device TR will be stepped to T0 while the timing device TK is on $t10$. Thus, the gate SG2 is opened to stop the pulse generator PG with the result that the divide key is automatically released.

The various steps of the calculation just described are shown in the following Table 7:

TABLE 7

| BR | 13 | 12 | 11 | 10 | 9 | BA | BC | CS | T | t | |
|---|---|---|---|---|---|---|---|---|---|---|---|
| 0 | 0 | 1 | 2 | 3 | 0 | A | C− | C̄ | 0 | 1 | 123 is entered in counters 12R, 11R and 10R. |
| 0 | 0 | 1 | 2 | 3 | 0 | A | C− | CS0 | 1–11 | 1–11 | Divide key is depressed and ten pulses are added into 1R to 11R setting CS. |
| 0 | 0 | 0 | 2 | 3 | 0 | A | C− | CS0 | 12 | 12 | Nine pulses added into 12R setting CS. |
| 9 | 0 | 0 | 2 | 3 | 0 | Ā | C− | CS0 | 13 | 13 | Ten pulses added into 13R and 9 pulses added into BR. |
| 9 | 0 | 9 | 2 | 3 | 0 | A | C− | C̄ | 12 | 12 | Nine pulses added into 12R. No carry. |
| 8 | 9 | 9 | 2 | 3 | 0 | Ā | C− | C̄ | 13 | 13 | Nine pulses added into 13R and BR. |
| 8 | 9 | 9 | 2 | 3 | 0 | A | C+ | C̄ | 0 | 1 | BC changed to C+. |
| 8 | 9 | 0 | 2 | 3 | 0 | A | C+ | CS0 | 12 | 12 | One pulse added into 12R setting CS. |
| 0 | 1 | 0 | 2 | 3 | 0 | Ā | C+ | CS0 | 13 | 13 | Two pulses added into 13R and BR. |
| 0 | 1 | 0 | 1 | 3 | 0 | A | C− | CS0 | 11 | 12 | Nine pulses added into 11R. |
| 9 | 1 | 0 | 1 | 3 | 0 | Ā | C− | CS0 | 12 | 13 | Ten pulses added into 12R and nine pulses into BR. |
| 8 | 1 | 0 | 0 | 3 | 0 | Ā | C− | CS0 | 11–12 | 12–13 | Nine pulses added into 11R and BR and ten pulses into 12R. |
| 7 | 1 | 9 | 9 | 3 | 0 | Ā | C− | C̄ | 11–12 | 12–13 | Nine pulses added into 11R, 12R and BR. |
| 7 | 1 | 9 | 9 | 3 | 0 | A | C+ | C̄ | 0 | 1 | BC changed to C+. |
| 7 | 1 | 9 | 0 | 3 | 0 | A | C+ | CS0 | 11 | 12 | One pulse added into 11R. |
| 0 | 1 | 2 | 0 | 3 | 0 | Ā | C+ | CS0 | 12 | 13 | Three pulses added into 12R and BR. |
| 9 | 1 | 2 | 0 | 2 | 0 | Ā | C− | CS0 | 10–11 | 12–13 | Nine pulses added into 10R and BR and ten pulses into 11R. |
| 8 | 1 | 2 | 0 | 1 | 0 | Ā | C− | CS0 | 10–11 | 12–13 | Nine pulses added into 10R and BR and ten pulses into 11R. |
| 7 | 1 | 2 | 0 | 0 | 0 | Ā | C− | CS0 | 10–11 | 12–13 | Nine pulses added into 10R and BR and ten pulses into 11R. |
| 6 | 1 | 2 | 9 | 9 | 0 | Ā | C− | C̄ | 10–11 | 12–13 | Nine pulses added into 10R, 11R and BR. |
| 6 | 1 | 2 | 9 | 9 | 0 | A | C+ | C̄ | 0 | 2 | BC changed to C+. |
| 6 | 1 | 2 | 9 | 0 | 0 | A | C+ | CS0 | 10 | 12 | One pulse added into 10R. |
| 0 | 1 | 2 | 3 | 0 | 0 | Ā | C+ | CS0 | 11 | 13 | Four pulses added into 11R and BR. |
| 9 | 1 | 2 | 3 | 9 | 9 | Ā | C− | C̄ | 9–10 | 12–13 | Nine pulses added into 9R, 10R and BR. |
| 0 | 1 | 2 | 3 | 0 | 0 | Ā | C+ | CS0 | 0–10 | 3–13 | One pulse added into 9R, 10R and BR. |
| 0 | 1 | 2 | 3 | 0 | 0 | Ā | C+ | C̄ | 0 | 10 | Shifting continues until T0 is coincident with t10 when machine stops. |

CLEARING

The machine may be provided with a "clear register" key and a "clear keys" key.

The "clear keys" key clears the keyboard mechanically and, when it is operated, it closes contacts momentarily to reset the timing device TK to *t*1.

The "clear register" key also resets the timing device TK to *t*1 and it closes two further switches. One of these applies a positive potential to each of the counting devices 1R to 12R causing it to be reset to 0. The other switch applies a negative potential to the various timing devices and bistable devices to return them all to their starting conditions.

A "reset" key may also be provided to reset the timing device TK to *t*1 without clearing either the register or the keys. This enables more than one number to be entered into the register by addition (2).

NON-SHIFT KEY

The machine may also be provided with a "non-shift" key.

The "non-shift" key is operative during multiplication to disable the gate TG5 so that the timing device TK is not stepped at the end of each multiplication stage. Thus, the timing devices TR and TK remain in step and accordingly each successive partial product is added to the accumulated products in the register without shift. For example, if 12 is multiplied by 1 and 2 with the "non-shift" key depressed the register will give the answer as 36.

DECIMAL POINTS

The machine hereinbefore described may be provided with additional equipment for indicating the position of a decimal point in the number in the register and for automatically moving the decimal point to the correct place when any of the previously described operations are performed. The additional equipment required is illustrated in FIG. 3 of the accompanying drawings.

The equipment illustrated in FIG. 3 includes a ring counter DC having eleven stages each controlling a respective one of eleven output terminals 0 to 10. Preferably, each of these output terminals is constituted by the cathode of a cold-cathode trigger tube. The counter is stepped from left to right as shown in the drawing by means of input pulses supplied from a pulse amplifier A1. Connected to the output terminals 0 to 10 are the anodes of eleven neon indicating tubes L0 to L10, and the cathodes of these indicating tubes are connected in common through a resistor R24 to a point having a potential of −125 volts. The arrangement is such that when any one of the cold-cathode trigger tubes in the ring counter DC is conductive, the neon indicating tube connected to its cathode will glow. The indicating tube L0 is located so that, when it is lit, a glowing point is visible to the right of the numeral-display means of the counting device 3R. The tube L1 is located between the numeral-display means of the counting devices 3R and 4R. The indicating tube L2 is located between the counters 4R and 5R, and so on up to the indicating tube L10 which is located between the counters 12R and 13R.

Also connected to each output terminal of the ring counter DC is a respective one of eleven resistors R1 to R11. The lower end of each of these resistors is connected to the anodes of a pair of rectifiers. Thus, the resistor R1 is connected to the anodes of two rectifiers W1 and W2, the resistor R2 is connected to the anodes of two rectifiers W3 and W4, and so on up to the resistor R11 which is connected to the anodes of two rectifiers W21 and W22. The cathode of each odd-numbered rectifier is connected to the white (normally unmade) contact of one of a series of change-over switches DK0 to DK10. These change-over switches are operated by eleven decimal point keys, each of which may be used to control the supply of input pulses to the ring counter DC in such a way as to light a respective one of the indicataing tubes L0 to L10. Normally, the keys DK0 to DK10 do not remain in the operated position after having been actuated but, if the machine is being used for multiplication or division, the keys are latched and remain in the operated position until the end of a calculation. In these circumstances, actuation of any decimal point key releases any other decimal point key that has been previously actuated.

The black (normally made) contact of the key DK10 is connected to the moving contact of the key DK9, the black contact of the key DK9 is connected to the moving contact of the key DK8, and so on up to the black contact of the key DK1 which is connected to the moving contact of the key DK0. The black contact of the key DK0 is connected to a point of positive potential and the moving contact of the key DK10 is connected through a resistor R23 to the base electrode of an n-p-n type transistor TR, the emitter of which is connected to a point at a potential of −20 volts. Besides being connected to the cathode of the rectifier W1, the white contact of the key DK10 is also connected through a resistor R12 to the terminal *t*12. Similarly, the white contact of the key DK9 is connected through a resistor R13 to the terminal *t*11, and so on up to the white contact of the key DK0 which is connected through a resistor R22 to the terminal *t*2.

The cathodes of the even-numbered rectifiers W2 to W22 are connected in common to the fixed contact of a normally unmade switch DM, the moving contact of which is connected to a point which is at a potential of −30 volts.

The input of the pulse amplifier A1 is constituted by the output of an "OR" gate DG1, the inputs of which are constituted by the outputs of five "AND" gates DG2 and DG6. The inputs of the gate DG2 are constituted by the terminal M, the P6 output of the pulse generator PG, a terminal D+ which will be described hereinafter, and a terminal which is positive throughout the periods T2 to T12. The inputs of the gate DG3 are constituted by the terminals STX, C−, M, T1 and D+, the P6 output of the pulse generator PG, a terminal marked DP and a terminal marked Y. The input DP is normally positive, but is made negative when a decimal point key for the bank of multiplier keys MK is actuated. The multiplier decimal point key latches down when operated and is released by the "clear-register" key. The terminal Y is normally positive, but is made negative if the "non-shift" key is operated. The inputs of the gate DG4 are constituted by the terminals D+, and XT, the P6 output of the pulse generator and a terminal which is positive throughout the periods T1 to T11. The inputs of the gate DG5 are constituted by the terminals C+ and D, a terminal D− which will be described hereinafter, the P6 output of the pulse generator and the terminal which is positive throughout the periods T1 to T11. The three inputs of the gate DG6 are connected respectively to the P6 output of the pulse generator, to the fixed contact of the switch DM and to the collector of the transistor TR.

The terminals D+ and D− referred to above are connected to the outputs of a bistable device BD, the terminal D− being positive in the unset state and the terminal D+ being positive in the set state. The bistable device BD may be set by means of a pulse from an "OR" gate DG12, the inputs of which are constituted by the outputs of three "AND" gates DG7, DG8 and DG13. One input of the "AND" gate DG7 is constituted by the terminal which is positive throughout the periods T1 to T11, and the remaining inputs of this gate are connected to the collector electrode of the transistor TR and the terminal $\overline{N}$ respectively. The inputs of the gate DG8 are constituted by the terminals *t*10 and N and the inputs of the gate DG13 are constituted by the terminal T1 and the fixed contact of the switch DM.

The bistable device BD may be unset by a pulse from an "OR" gate DG11, the inputs of which are constituted (not shown) by a terminal which is energised when the "clear register" key is operated and by the outputs of two "AND" gates DG9 and DG10. Two of the inputs of each of the gates DG9 and DG10 are constituted by the terminals T1 and *t*1. The two remaining inputs of the gate DG9 are constituted by the terminals C− and XT and the two remaining inputs of the gate DG10 are constituted by the terminals C+ and D.

Normally, the 0 terminal of the ring counter DC is positive so that the indicatig tube L0 is glowing. The ring counter is set to 0 by the application of a positive pulse to the trigger electrode of the 0 trigger tube when the "clear register" key is operated. If, however, one of the keys DK1 to DK10 is actuated, the ring counter will be stepped so that the corresponding stage is conductive.

The bistable device BD is set and unset by negative pulses and the "OR" gates DG11 and DG12 include capacitive couplings. Thus, the device BD is set when any one of the inputs of either of the gates DG7 and DG8 becomes negative after all the inputs of that gate have been positive. Similarly, the device BD is unset when any of the inputs of either of the gates DG9 and DG10 becomes negative after the inputs of that gate have been positive. It is also unset when the "clear register" key is operated.

As has already been pointed out, the switch DM is normally open and under these conditions the right-hand input of the gate DG6 and the cathodes of the even-numbered diodes W2 to W22 are at a potential of +12 volts. When one of the keys DK1 to DK10 is depressed, a connection is made between the base electrode of the transistor TR, through the resistor R23, one of the odd-numbered diodes W1 to W21 and one of the resistors R1 to R11, to a respective one of the terminals 1 to 10 of the ring counter DC. Assuming that the ring counter is on 0, all the terminals 1 to 10 will be negative and, as a result, whichever of the keys DK1 to DK10 is operated, the transistor TR will be rendered non-conductive. Thus, the collector of the transistor TR becomes positive and P6 pulses are able to pass through the gate DG6 to drive the ring counter DC. When the stage of the ring corresponding to the actuated decimal point key becomes conductive, its output terminal becomes positive and the transistor TR also becomes conductive. As a result, the collector of the transistor TR goes negative and the gate DG6 is closed to stop the drive pulses. When the decimal point key is released, the base electrode of the transistor TR is connected to *t*12 volts and accordingly the transistor remains conductive. Thus, the neon indicating tube corresponding to an actuated decimal point key lights and remains lit until further stepping pulses are applied to the ring counter DC.

When performing addition and subtraction, it is only necessary to insert the decimal point at the correct place when the first number is entered in the register and thereafter to take care that other numbers are entered in the same relative positions. Thus, for example, if the neon tube L7 is illuminated, the number 123 must be inserted with the 1 in the bank 10K, the 2 in the bank 9K and the 3 in the bank 8K. Similarly, the number 1.4 must be inserted with the 1 in the bank 8K and the 4 in the bank 7K. During addition and subtraction, providing the numbers are correctly inserted as indicated above, the answer will remain correct without movement of the decimal point. During multiplication and division, however, there may be a decimal point in the multiplier or divisor as well as in the multiplicand or dividend. In these cases, therefore, means must be provided for automatically moving the decimal point as the calculation proceeds. Similarly, when left shift or right shift is performed, the decimal point must be moved with the number in the register.

MULTIPLICATION (1)

To illustrate the manner in which the position of the decimal point is controlled when the machine is to be used for multiplication of a multiplicand entered on the main keyboard by a multiplier entered digit by digit on the multiplier keys, the multiplication of 3.4 by 17.1 will be described.

Initially, the multiplicand 3.4 is set on the keys of the machine, for example, by the depression of the number 3 key in the order 10K, the number 4 key in the order 9K and the key DK9. The three depressed keys will lock down, but the machine will not start to operate and the ring counter DC will remain on 0 since the switch DM will be closed.

The first digit of the multiplier 17.1 is now entered in the multiplier keys by the depression of key 1 in the bank MK. This key locks down and the counting device 11R is stepped from 0 to 4 during the period T11 and the counting device 12R is stepped from 0 to 3 during the period T12, as described above. Further, during the period T11, the counting device TK will be on *t*11 and accordingly the *t*11 waveform will be applied through the operated switch DK9 to the base electrode of the transistor TR. Accordingly, the transistor TR will become conductive at the beginning of the period t11 and at this time a negative step will be applied to one input of the gate DG7 from the collector of the transistor TR. Since the terminals $\overline{N}$ and T2 to T12, as well as the collector of the transistor TR have previously been positive, the output of the gate DG7 has been positive. However, the negative step on the collector of the transistor closes the gate and causes the output to go negative. As a result, a negative pulse is applied through the capacitive coupling in the gate DG12 to set the bistable device BD. As a result, the P6 pulse during this period is passed through the gate DG2 to step the ring counter DC from 0 to 10. The bistable device BD remains set and accordingly the P6 pulse is also applied to the ring counter during the period T12, so that the neon tube L9 is lit. No pulse can pass through the gate DG2 during the period T13 and accordingly when the number 1 multiplier key is released, the neon tube L9 is still lit. As has already been pointed out, this neon tube is located between the display tubes of the counters 12R and 11R and accordingly the register now reads 3.4.

When the number 7 multiplier key is depressed, 3 is added in the counting device 11R and 4 is added in the counting device 10R, as explained above. During the period T1, all the inputs of the gate DG3 are energised and accordingly the P6 pulse steps the ring counter DC from 9 to 8. Further, during the periods T2 to T12, eleven further P6 pulses are applied to the ring counter DC to step it from 8 to 8. During the next period T0, the bistable device BC is set, so that the terminal C+ is energised in place of the terminal C−. Accordingly, no pulse is applied to the ring counter DC during the next period T1. However, eleven pulses are again applied through the gate DG2 during the periods T2 to T12, but these pulses merely serve to step the ring counter from 8 to 8. Thus, at the end of the calculation, the neon tube L8 remains lit and accordingly the register reads 57.8.

Before the next digit of the multiplier is entered, the multiplier decimal point key is depressed to remove the positive potential from the terminal DP. Thus, during the next period T1, although the terminal C− has again become positive, no pulse can pass through the gate DG3. Again, during the periods T2 to T12, eleven pulses pass through the gate DG2 to step the ring counter from 8 to 8. During the periods T10 and T9, 34 is added into the counting devices 10R and 9R and thus at the end of the calculation the register reads 58.14.

MULTIPLICATION (2)

To illustrate the manner in which the position of the decimal point is controlled when the machine is to be used for multiplication of a multiplicand entered on the main keyboard by a multiplier standing in the register, it will again be assumed that 3.4 is to be multiplied by 17.1.

Initially, the multiplier 17.1 is entered in the register, for example, by setting the machine as for addition (1) and by the depression of the number 1 key in the order 10K, the number 7 key in the order 9K, the number 1 key in the order 8K and the key DK8. Thus, the counter 12R reads 1, the counter 11R reads 7 and the counter 10R reads 1.

As described above, the switch DM is open during addition (1) and the ring counter is stepped by P6 pulses through the gate DG6 until the neon tube 8 is lit. As the neon tube L8 is located between the counting devices 11R and 10R, the register reads 17.1.

It is to be noted that, since the switch DM is open during addition, its fixed contact is positive and accordingly both inputs of the gate DG13 are positive during the period T1. At the end of this period the gate DG13 closes, so that the bistable device BD is set with its output D+ energised. Neither of the gates DG9 or DG10 is open at this stage of the calculation and accordingly the bistable device BD remains set.

The machine is now set for multiplication (2) and the multiplicand 3.4 is inserted on the keys by the depression of the number 3 key in the order 10K, the number 4 key in the order 9K and the key DK9. When the key DK8 was depressed during the entry of the multiplier into the register, this key did not latch down as the machine was set for addition (1).

With the machine set for multiplication (2), however, the key DK9 will remain in the actuated position.

When the special start key is depressed, the timing device TR steps from T0 to T1 and the timing device TK is moved directly to t10. During the periods T1 to T11, eleven pulses are applied to the ring counter DC through the gate DG4 to step it from 8 to 8. Eleven further pulses will be applied to the ring counter DC through the gate DG4 during each cycle of operation of the timing device TK while pulses are being added into BR and the successively higher counting devices of the register. Eventually, when the period T10 coincides with the period t13, nine pulses added into the counting device 10R will produce a carry, so that the bistable device BC is changed to C+. Three pulses will then be added into the counting device 9R and four pulses into the counting device 8R. At this time, the buffer counter BR will be on 0 and the bistable device BC will be changed to C−. Three pulses will then be added into 11R and BR producing a carry and changing BC to C+. Three pulses will then be added seven times into the counting device 10R and four pulses will be added seven times into the counting device 9R. At this time the buffer counter BR will reach 0 and the bi-stable device BC will be changed back to C−. Nine pulses will then be entered into the counting device 12R and the buffer counter BR producing a carry and changing the bistable device BC to C+. Three pulses will then be added into the counting device 11R and four pulses into the counting device 10R. At the end of this addition, the counting device TR will be on T12 and the counting device TK will be on t13. The bistable device BC will be changed to C− and the timing device TR will be stepped to T13 while the counting device TK is stepped to t1. The timing device TR will then be stepped to T0 and T1, but the timing device TK will remain on t1. Accordingly, all the inputs of the gate DG9 are positive and the negative-going trailing edge of the pulse t1 will unset the bistable device BD so that its output D− is energised in place of its output D+, thus closing the gate DG4. At T11, the timing device TK will be on t11 and this timing pulse will be applied to the base electrode of the transistor TR through the closed contacts of the key DK9. The leading edge of this pulse will appear as a negative step on the collector of the transistor and will pass through the gates DG7 and DG12 to set the bistable device BD, so that the output D+ is again energised. Thus, the P6 pulse occurring during the period T11 will pass through the gate DG4 to step the ring counter DC from 8 to 7, so that the neon tube L7 is lit. When the timing device TR reaches T0, the timing device TK is on t13 and accordingly the machine stops with the register reading 0058.1400000.

DIVISION

In order to explain the control of the position of the decimal point in division, it will be assumed that 14.6 is to be divided by 1.2.

Initially, 1 is entered in the counting device 12R, 4 in the counting device 11R and 6 in the counting device 10R and the neon tube L8 is lit by depression and release of the decimal point key DK8. The machine is then set for division and the number 1 key is depressed in the order 10K and the number 2 key in the order 9K. Further, to locate the decimal point between the 1 and the 2 in the divisor, the decimal point key DK9 is depressed and will latch down.

As the machine is set for division, it will be seen that the only input gate for the ring counter DC that is operative is the gate DG5 and this gate is closed at the beginning of the division operation, since the bistable device BD is set by means of the gate DG13 at the end of the period T1 during the entry of the dividend into the register.

The gate DG5 remains closed during the first series of subtractions, but at the beginning of the add-back cycle just after the bistable device BC is changed to C+, all the inputs of the gate DG10 will be energised and accordingly the bistable device BD will be unset at the end of the period T1 (*t*1). Thus, the gate DG5 is opened and P6 pulses will be applied to the ring counter DC until the bistable device BD is set again at the beginning of the period *t*11, as a result of the closure of the gate DG7 when the transistor TR is rendered conductive by the application of the *t*11 pulse to its base electrode through the operated switch DK9. Accordingly, ten pulses will be applied to the ring counter DC to step it from 8 to 9, so that the neon tube L9 is lit in place of the neon tube L8.

The gate DG5 remains closed throughout the second series of subtractions and cannot open during the second add-back because at this stage T1 is not coincident with *t*1. Thus, the neon tube L9 remains lit throughout the calculation and at the end of the calculation the register will read 12.166666660.

ADDITION (2)

To explain the control of the decimal point when numbers are added into the register from the multiplier keys it will be assumed that the number 3.4 is to be added to the number 5.7. Before the start of the calculation, the register will be cleared and accordingly the bistable device BD will be unset. Further, the terminal M will be positive and the switch DM will be closed.

To insert 3.4 into the register, the number 3 multiplier key is first depressed and at this stage all the input gates of the ring counter DC will be closed. However, during the period *t*10, all the inputs of the gate DG8 will be energised and at the end of *t*10, a negative pulse will be applied to the bistable device BD to set it so that its output D+ is energised in place of its output D−. Consequently, during the period T11, the P6 pulse will pass through the gate DG2 to step the ring counter from 0 to 10 and during the period T12 the ring counter will be stepped from 10 to 9. During the next period T0, the bistable device BC is set so that no pulse can pass through the gate DG3 during the next period T1. However, eleven pulses are applied to the ring counter DC during the periods T2 to T12 to step it from 9 to 9. Thus, when the number 3 multiplier key is released the register reads 03.000000000.

The multiplier decimal point key is now depressed to put a negative potential on the terminal DP. Thus, when the number 4 multiplier key is depressed, eleven pulses are applied through the gate DG2 to step the ring counter DC from 9 to 9 and the register reads 03.4000000000.

The special key is now depressed to reset the timer TK to *t*1 and the number 5 multiplier key is depressed. Since the decimal point multiplier key remains latched down, the P6 pulse cannot pass through the gate DG3 during the period T1. However, eleven pulses will be applied to the ring counter DC through the gate DG2 during each of the five cycles performed by the machine to step the counter 12R from 3 to 8. When the number 7 multiplier key is depressed, the gate DG3 remains closed and the machine performs seven cycles to step the counter 11R from 4 to 1. The carry store functions in the normal way and accordingly during the period T12, after the counting device 11R has been stepped from 9 to 0, the P0 pulse is applied to the counter 12R to step it from 8 to 9. It is to be noted that the decimal point is not moved when the second number is added into the register. Accordingly, care must be taken to ensure that it is inserted in the correct orders of the register having regard to the decimal point already standing there. Thus, if the second number had been 0.57, it would have been necessary to press the 0 multiplier key before the number 5 multiplier key. Similarly, if the second number had been 57, it would have been necessary to press the 0 multiplier key before the number 3 multiplier key when inserting the first number, so that sufficient room would be left for the insertion of both digits of the second number to the left of the decimal point.

RIGHT SHIFT

During right shift, the only movement of the decimal point required is that it should be shifted one place to the right during each shift operation. The right-shift operation itself is equivalent to multiplication (2) and the control of the decimal point is effected in the same way as in multiplication (2). Thus, if it is assumed that the number 12.3 is standing in the counting devices 12R, 11R and 10R (the neon tube L8 being lit), the right-shift operation will proceed in precisely the same manner as described above with reference to the shifting of the number 123 until the counting device TR is on T1 and the counting device TK is on *t*1 with the bistable device BC unset. It is to be understood that the entry of the number 12.3 into the register will have resulted in the bistable device BD being set and accordingly the gate DG4 will have been open throughout the shift operation. Accordingly, eleven pulses will have been applied to the ring counter DC during each cycle of operation so that the counter is stepped from 8 to 8 during each cycle. At T1 (*t*1) all the inputs of the gate DG9 will be positive and at the end of this period the bistable device BD will be unset, closing the gate DG4. At *t*10, all the inputs of the gate DG8 will be energised and at the end of this period the bistable device BD will again be set. Thus, the gate DG4 will be open during the period *t*11 and one pulse will pass through the gate DG4 to step the ring counter DC from 8 to 7. Thus, the neon tube L7 will light in place of the tube L8 and the decimal point will be correctly placed in the shifted number.

LEFT SHIFT

During the left shift, the only movement of the decimal point required is that it should be shifted one place to the left during each shift operation. The left-shift operation itself is equivalent to division and the control of the decimal point is effected in the same way as in division. Thus, if it is assumed that the number 12.3 is standing in the counting devices 12R, 11R and 10R (the neon tube L8 being lit), the left-shift operation will proceed in precisely the same manner as described above with reference to the shifting of the number 123 until the bistable device BC is changed to C+. Up to this time the gate DG5 will have been closed because the bistable device BD is left set with its output D+ energised as a result of the insertion of the number 12.3 into the register. When the bistable device BC changes to C+, all the inputs of the gate DG10 will be energised at the beginning of the P0 pulse occurring during the period T1 (*t*1) and accordingly the bistable device BD will be unset at the end of this P0 pulse. Thus, the gate DG5 is opened and P6 pulses will be applied to the ring counter DC until the bistable device BD is set again by means of the gate DG8. All the inputs of this gate are energised during the period *t*10 and accordingly a negative step will be applied to the bistable device BD through the gate DG12 at the end of the period *t*10. Thus, ten pulses will be applied to the ring counter DC to step it from 8 to 9 so that the neon tube L9 is lit in place of the neon tube L8.

The gate DG5 remains closed throughout the rest of the shift operation because the period T1 is not coincident again with the period $t1$. Thus, the neon tube L9 remains lit and the register will read 12.300000000.

What we claim as our invention and desire to secure by Letters Patent of the United States is:

1. A calculating machine for multiplying a multi-digit multiplicand by a multi-digit multiplier in a succession of multiplication stages, including a plurality of keys for entering said multiplicand, a register comprising a plurality of electric pulse-operated counting devices each representing a denominational order, means for entering the multiplier in said register, means operative during each of said successive multiplication stages to reduce one digit of said multiplier to zero, commencing with the least significant digit, and means operative after each of said multiplier digits has been reduced to zero to add at least the most significant digits of the multiplicand into counting devices of said register representing lower orders than the order of said reduced multiplier digit a number of times equal to the original value of that multiplier digit.

2. A calculating machine for multiplying a multi-digit multiplicand by a multi-digit multiplier in a succession of multiplication stages, including a plurality of keys for entering said multiplicand, a register comprising a plurality of electric pulse-operated counting devices each representing a denominational order, a pulse generator for supplying pulses to said counting devices, means for entering the multiplier in said register, means for coupling said pulse generator to counting devices representing successively higher denominational orders in said successive stages, means for cutting off the supply of pulses to said coupled counting device when the said coupled counting device reaches zero, and means operative after said coupled counting device has reached zero to add into counting devices representing lower orders than the order of said coupled counting device, at least the most significant digits of said multiplicand a number of times equal to the numerical value of the digits registered by said coupled counting device before the commencement of the supply of pulses thereto, whereby the counting devices containing the digits of the multiplier are successively caused to register zero during successive stages of the calculation and at least the most significant digits of the multiplicand are introduced into the register during each successive stage of the calculation a number of times equal to the numerical value of the digit of the multiplier that has been reduced to zero in that stage.

3. A calculating machine for multiplying a multi-digit multiplicand by a multi-digit multiplier in a succession of multiplication stages, including a plurality of keys for the entry of said multiplicand, a register comprising a plurality of electric pulse-operated counting devices each representing a denominational order, means for entering the multiplier in said register, a buffer counter, means operative during each of said succession of multiplication stages to enter the complement of the number registered by one of said counting devices in the buffer counter, means operative repetitively after said complement has been entered in said buffer counter to add into counting devices of the register representing lower orders than the order of said one of said counting devices at least the most significant digits of said multiplicand, means for counting said repetitive additions by adding pulses into the buffer counter, and means controlled by said buffer counter for terminating said repetitive additions when said multiplicand has been added into the register a number of times equal to the numerical value of the number whose complement has been entered in the buffer counter.

4. A calculating machine including a plurality of groups of keys each group representing a denominational order and each key having a numerical value, a register comprising a plurality of electric pulse-operated counting devices each representing a denominational order, a pulse generator, a buffer counter, a carry store set when any of said counting devices is stepped to zero, a plurality of first gating means for coupling respective ones of the counting devices to a common line, a plurality of second gating means each operative when closed to enable the number of pulses supplied to said common line by said pulse generator to be controlled by a respective one of said groups of keys, a first timing device controlling said first gating means, a second timing device controlling said second gating means, means for stepping said timing devices so that the gating means are rendered operative in succession, pulsing means controlled by said second timing device for enabling pulses to be applied by said pulse generator to the buffer counter and to the common line at a time when one of said first gating means is operative but none of the second gating means are operative, a bistable device changed over when said carry store is set, and a buffer gate opened by the changeover of said bistable device to apply one pulse to said buffer counter during each cycle of said first timing device.

5. A calculating machine for dividing a multi-digit dividend by a multi-digit divisor to produce the quotient thereof, including a plurality of first counting devices each representing a denominational order, a second counting device representing the next order above the highest order represented by the first counting devices, a third counting device initially registering zero, carry means operative between adjacent ones of said first counting devices and between the highest of said first counting devices and the second counting device, means for entering a dividend into the first counting devices, means for storing a divisor, means for performing repeated subtraction of the divisor from the dividend, means for ascertaining when there is no carry from the highest of said first counting devices to the second counting device, means controlled by said ascertaining means for adding the divisor back once to the dividend remainder, means for subtracting unity from the number registered by said third counting device during each of said repeated subtractions, and means for adding into said second counting device the complement of the number registered by the third counting device after the completion of said repeated subtractions to form a digit of the quotient.

6. A calculating machine including a plurality of counting devices forming a register, a plurality of groups of keys each group representing a denominational order and each key in the group having a numerical value, means for setting the machine alternatively to a first state and a second state, first means responsive to the setting of the machine to said first state and including means for performing repeated subtraction of a divisor set on said keys from a dividend stored in said register, means for adding the divisor back once to the dividend remainder after the dividend remainder has become negative, means for counting the number of subtractions performed so as to form successive digits of the quotient and means for entering each successive digit of the quotient into the counting device representing the denominational order above that represented by the counting device containing the highest order digit of the dividend remainder, and second means responsive to the setting of the machine to the second state and including means operative during a plurality of successive multiplication stages for reducting to zero one digit of a multiplier stored in said register commencing with the least significant digit and means operative after each of said multiplier digits has been reduced to zero to enter the partial product of a multiplicand set on said keys and the respective digit of the multiplier into counting devices of said register representing denominational orders lower than that represented by the counting device containing said multiplier digit.

7. A calculating machine for performing division comprising a register formed by a plurality of electric pulse-operated counting devices, means for entering a dividend in said register, means for storing a divisor, means for controlling said machine to perform addition or subtraction cycles, a carry store set when any one of said counting devices reaches zero, means controlled by said carry store for setting said controlling means to addition when the carry store is not set at the end of a subtraction, means for setting said controlling means to subtraction at the beginning of a calculation and also after one addition cycle has been performed, a buffer counter, means for applying pulses to said buffer counter to count the number of subtraction cycles performed, means for selecting counting devices in said register representing progressively lower orders of the register, and means for applying pulses to said buffer counter and to the selected counting device until the buffer counter registers zero, whereby one digit of the quotient is inserted in said selected counting device.

8. A calculating machine comprising a register composed of a plurality of electric pulse-operated counting devices, means for entering a dividend in said register, means for storing a divisor, a common pulse entry line, a first timing device adapted to couple said pulse entry line to counting devices in succession, means to subtract the divisor repeatedly from said dividend, a buffer counter, means for adding nine pulses to said buffer counter for each of said repeated subtractions, a pulse entry line gate circuit, means for supplying pulses to said pulse entry line through said pulse entry line gate circuit, a buffer counter gate circuit coupling said buffer counter to said pulse entry line, one input of said pulse entry line gate circuit being controlled by said buffer counter so that it is closed when said buffer counter registers zero.

9. A calculating machine comprising a keyboard in the form of a plurality of orders of keys, a register in the form of a plurality of pulse-operated counting devices, a pulse generator, a bank of multiplier keys, switch means adapted to select the arithmetical function to be performed by the machine, means, operative when said switch means are set to cause the machine to divide a dividend in said register by a divisor set on said keyboard, for causing said orders of keys to control the number of pulses supplied by said pulse generator to progressively lower counting devices of said register, means, operative when said switch means are set to cause the machine to multiply in said register, for causing said orders of keys to control the number of pulses supplied by said pulse generator to progressively higher counting devices of said register, and means, operative when said switch means are set for causing the machine to multiply a multiplicand set on said keyboard by a multiplier set in digit-by-digit on said multiplier keys for causing the highest order of keys to control the number of pulses supplied by said pulse generator to the highest order counting device when the first multiplier digit is entered, for causing said highest order of keys to control the number of pulses supplied by said pulse generator to the next counting device below said highest counting device when the second multiplier digit is entered, and for causing said highest order of keys to control the number of pulses supplied by said pulse generator to successively lower order counting devices as subsequent multiplier digits are entered.

10. A calculating machine as claimed in claim 9, including means for automatically preventing the machine from starting if a multiplier key is actuated after the highest order of keys has been caused to control the number of pulses supplied by the pulse generator to the lowest order counting device.

11. A calculating machine comprising a register including a plurality of electric pulse-operated counting devices, a keyboard in the form of a plurality of orders of keys, each order of keys being operative to control the number of pulses entered into a respective associated one of said counting devices, a plurality of gate circuits which determine the type of calculation performed by the machine, switch means for applying potentials to said gate circuits to open and close them in accordance with the type of calculation to be performed, means for controlling the association of said orders of keys and said counting devices, and means for influencing said controlling means so that, when said switch means are set to cause the machine to divide a dividend in said register by a divisor on said keyboard, the counting devices are associated with progressively higher orders of keys during successive stages of the division, whereas when said switch means are set to cause the machine to multiply a multiplicand on said keyboard by a multiplier in said register, the counting devices are associated with progressively lower orders of keys during successive stages of said multiplication.

12. A calculating machine comprising a plurality of electric pulse-operated counting devices arranged to form a register, a pulse generator, a common pulse entry line, a plurality of orders of keys, a register timing device which renders said counting devices operative to receive pulses from said common pulse entry line during successive periods of each cycle of operation of said register timing device, a keyboard timing device which renders said orders of keys operative to control the supply of pulses from said pulse generator to said common pulse entry line during successive periods of said keyboard timing device, means for changing the relative timing of said periods of the timing devices so that said keyboard timing device falls back relative to said register timing device to enable each order of keys to control the supply of pulses to successively higher order counting devices in the register, and means for changing the relative timing of said periods of said timing devices so that said keyboard timing device is advanced relative to said register timing device to enable each order of keys to control the supply of pulses to successively lower order counting devices in the register.

13. A calculating machine comprising a plurality of electric pulse-operated counting devices arranged to form a register, a pulse generator, a common pulse entry line, a plurality of orders of keys, a register timing device stepped by means of stepping pulses from said pulse generator and arranged to render said counting devices operative to receive pulses from said common pulse entry line in succession, a keyboard timing device arranged to render said orders of keys operative in succession to control the supply of pulses from said pulse generator to said common pulse entry line, and a plurality of gate circuits controlled by the register timing device through which stepping pulses are applied from said pulse generator to said keyboard timing device, and means for rendering selected ones of said gate circuits operative in dependence on the type of calculation being performed.

14. A calculating machine comprising a plurality of electric pulse-operated counting devices arranged to form a register, a pulse generator, a common pulse entry line, a plurality of orders of keys, a register timing device stepped by means of stepping pulses from said pulse generator and arranged at successive steps to render said counting devices operative in succession to receive pulses from said common pulse entry line, a keyboard timing device arranged at successive steps to render said orders of keys operative in succession to control the supply of pulses from said pulse generator to said common pulse entry line, a first gate circuit through which stepping pulses from said pulse generator are applied to said keyboard timing device said first gate circuit being controlled by said register timing device so that it is open when the register timing device is on all its steps except two, a plurality of switces adapted to select the arithmetical function to be performed by the machine, a plurality of terminals the potentials of which are controlled by said switches, second, third and fourth gate circuits for applying stepping pulses from said pulse generator to said keyboard timing device each having one of its input connected to one of said terminals, other inputs of said second gate circuit being connected so that, provided the one of said terminals that is connected to its input is energised, it is open during one of the periods of the register timing device when the first gate circuit is closed so that the two timing devices normally remain in step but is closed once during each stage of the calculation so that the keyboard timing device falls back one step with respect to the register timing device once during each stage, other inputs of said third gate circuit being connected so that provided the one of said terminals that is connected to its input is energised, it is open throughout the other of the periods of the register timing device when the first gate circuit is closed, so as to maintain the two timing devices in step, and other inputs of the fourth gate circuit being connected so that provided the one of said terminals that is connected to its input is energised, it is opened once in each stage of a calculation during said one of the periods of the register timing device when the first gate circuit is closed so that the keyboard timing device is advanced one step with respect of the register timing device once during each stage.

15. A calculating machine as claimed in claim 14, and further including means for delaying the stepping pulses from the pulse generator applied to the register timing device with respect to the stepping pulses from the pulse generator applied to the keyboard timing device.

16. A calculating machine adapted to perform a calculation to produce an answer and comprising a plurality of electric pulse-operated-counting devices arranged to form a register, a plurality of orders of keys being operative to control the number of pulses applied to a respective associated one of said counting devices, a plurality of switches adapted to select the arithmetical function to be performed by the machine, a plurality of terminals the potentials of which are controlled by said switches, means, operative when a first one of said terminals is energised, to associate the highest order of keys during the first stage of the calculation with the highest order counting device and thereafter to associate said highest order of keys with progressively lower order counting devices until in the last stage of the calculation it is associated with the lowest order counting device in the register, and means operative when a second one of said terminals is energised to associate the highest order of keys during the first stage of the calculation with the lowest order counting device and thereafter to associate said highest order of keys with progressively higher order counting devices until in the last stage of the calculation it is associated with the highest order counting device in the register.

17. A calculating machine as claimed in claim 16, including a further counting device representing the denominational order above the highest order counting device and adapted to receive the first digit of the answer in the first calculation and a plurality of additional counting devices representing denominational orders below said lowest order counting device and adapted to receive digits of the answer and to correct the digit in said lowest order counting device by providing carries thereto if necessary.

18. A calculating machine including a plurality of groups of digit keys each group representing a denominational order and each key in a group having a numerical value, a register comprising a plurality of electric pulse-operated counting devices each representing a denominational order, a bistable control device which is normally unset at the beginning of a calculation, a buffer counter, means controlled by said bistable control device and operative, when it is unset, to apply pulses to said buffer counter and also to one of the counting devices until said one counting device registers zero, means responsive to said one counting device registering zero for setting the bistable control device, and further means controlled by said bistable control device and operative, when it is set, to add into the register digits corresponding to at least some of any actuated keys in said groups of digit keys, a number of times dependent on the content of said buffer counter and equal to the number registered by said one counting device before the application of said pulses thereto.

19. A calculating machine as claimed in claim 18, including means for applying one pulse to the buffer counter for each of said entries into the register, and means for unsetting the bistable control device when the buffer counter registers zero.

20. A calculating machine comprising a plurality of orders of keys, a plurality of counting devices constituting a register, a pulse generator, a common pulse entry line, a buffer counter, first and second timing devices, a carry store set when any of the counting devices is stepped to zero, first gating means controlled by the first timing device to couple respective ones of the counting devices in succession to the common pulse entry line, means for controlling the supply of pulses from said pulse generator to said common pulse entry line, second gating means controlled by the second timing device to couple said groups of keys in succession to said controlling means, third gating means controlled by the carry store to enable pulses to be applied to the common pulse entry line at a free period of the second timing device namely when all the second gating means are closed, and fourth gating means controlled by said second timing device to enable pulses appearing on the common pulse entry line during the said free period to be applied to the buffer counter, whereby the number registered by any one of said counting devices may be transferred to said buffer counter.

21. A calculating machine according to claim 20, including a bistable control device which controls the third and fourth gating means so that they are closed when it is set, means for setting said control bistable device when the carry store is set during said free period, and means for unsetting said control bistable device when the buffer counter registers zero.

22. A calculating machine according to claim 20, including means for setting the second timing device at the start of a calculation so that during the first stage of a calculation the relative timing of the first and second timing devices is such that the digits set on the three key groups representing the highest denominational orders are entered into the three counting devices representing the lowest denominational orders of the register a number of times equal to the digit registered by the counting device representing the denominational order immediately above said lowest denominational orders of the register, said latter counting device being caused to register zero at the beginning of this first stage, and means for suppressing one of the stepping pulses applied to said second timing device at the end of each further stage of the calculation so that during the second stage of the calculation the digits set on the four key groups representing the highest denominational orders are added into the four counting devices representing the lowest denominational orders of the register a number of times equal to the value of the digit registered by the next higher counting device said higher counting device being caused to register zero at the beginning of said second stage, and so on during further stages of the calculation until in the last stage the digits set on all the key groups are added into the counting devices representing denominational orders immediately below the highest order of the register a number of times equal to the value of the digit registered by the highest counting device said highest counting device being caused to register zero at the beginning of said last stage.

23. A calculating machine comprising a register composed of a plurality of electric pulse-operated counting devices, a pulse generator, a key bank having a plurality of digit keys each having a numeral value, a buffer counter, means operative in response to the actuation of any of said digit keys for applying a pulse to one of said counting devices, means operative when the numerical value of the actuated digit key is greater than unit for applying a number of pulses to said buffer counter equal to the twelves complement of the value of the actuated digit key, and means operative on the completion of the entry of pulses into said buffer counter to enter a single pulse into said one of said counting devices a further number of times determined by the number registered by said buffer counter and equal to one less than the value of the actuated digit key, means for adding one pulse into the buffer counter for each further entry of a single pulse into said one of said counting devices, and means operative when the buffer counter registers zero for stopping the machine.

24. A calculating machine comprising a register, a multi-digit store, a single bank of multiplier keys each having a numerical value, a buffer counter, means operative in response to the actuation of any one of said multiplier keys for initiating a single cycle of operation, means operative in response to the actuation of any one of said multiplier keys having a numerical value greater than unity for entering in said buffer counter a number dependent on the numerical value of the actuated multiplier key, means operative on the completion of the entry of said number into said buffer counter for initiating a further number of said cycles of operation, said further number being determined by the number in the buffer counter and being equal to one less than the value of the actuated multiplier key, and means operative during each of said cycles of operation for adding the digits stored in said multi-digit store once into said register.

25. A calculating machine as claimed in claim 24, wherein the number entered in the buffer counter is the twelves complement of the actuated multiplier key, and further including means for adding unity into the buffer counter for each of said further cycles of operation, and means responsive to the registration of zero by said buffer counter to cause the machine to perform one further cycle of operation.

References Cited

UNITED STATES PATENTS

| | | | |
|---|---|---|---|
| 2,512,851 | 6/1950 | Crosman | 250—27 |
| 2,575,331 | 11/1951 | Compton et al. | 235—61 |
| 2,954,167 | 9/1960 | Williams et al. | 235—160 |
| 2,955,757 | 10/1960 | Beranger | 235—160 |
| 2,961,160 | 11/1960 | Bell et al. | 235—160 |
| 3,034,721 | 5/1962 | Schulze | 235—160 |
| 3,036,775 | 5/1962 | McDermid et al. | 235—165 |
| 3,047,227 | 7/1962 | Thomas et al. | 235—153 |
| 3,239,654 | 3/1966 | Jackson et al. | 235—168 |
| 3,253,132 | 5/1966 | Pendleton | 235—168 |
| 3,258,583 | 6/1966 | Davies | 235—151.11 |
| 3,280,315 | 10/1966 | Kitz | 235—160 |
| 3,281,794 | 10/1966 | Townsend | 340—172.5 |
| 3,296,425 | 1/1967 | Kitz et al. | 235—160 |
| 3,294,960 | 12/1966 | Townsend | 235—160 |
| 3,308,280 | 3/1967 | Crowther et al. | 235—160 |
| 3,308,281 | 3/1967 | Crowther et al. | 235—160 |

MALCOLM A. MORRISON, Primary Examiner

D. H. MALZAHN, Assistant Examiner

PO-1050
(5/69)

UNITED STATES PATENT OFFICE
CERTIFICATE OF CORRECTION

Patent No. 3,513,303 Dated May 19, 1970

Inventor(s) Norbert Kitz et al

It is certified that error appears in the above-identified patent and that said Letters Patent are hereby corrected as shown below:

Column 6, line 9, for "of" (first occurrence) substitute --to--.
Column 15, line 7, for "A" substitute --Ā--.
Column 17, cancel lines 35 and 36 and rewrite as follows: --gised and will also step the timing device TR from T3 to T4 and the timing device TK from t3 to t4.--.
Column 21, Table 2, 6th line in last column, for "and" substitute --the--.
Column 21, Table 2, under the heading T, 10th line, for "1" substitute --11--.
Column 24, line 38, for "TGG8" substitute --TG8--;
line 40, after "counter" insert --BR--.
Column 26, Table 4, under the heading t, 12th line, for "1" substitute --11--.
Column 27, line 53, for "p9" substitute --P9--;
line 71, for "CSG11" substitute --CSG1--.
Column 29, line 5, for "p9" substitute --P9--.
Column 33, line 21, for "inner" substitute --timer--;
line 22, for "is TO" substitute -- is on TO--;
Table 6, under the heading 12, third line from the bottom, "8" substitute --0--.
Column 35, line 8, for "stop" substitute --step--.
Column 43, line 63, for "03.4000000000" substitute --03.400000000--.

Signed and sealed this 10th day of August 1971.

(SEAL)
Attest:

EDWARD M.FLETCHER,JR.
Attesting Officer

WILLIAM E. SCHUYLER, JR.
Commissioner of Patents